(12) United States Patent
Brandão et al.

(10) Patent No.: US 11,256,477 B2
(45) Date of Patent: *Feb. 22, 2022

(54) AMPLIFYING, GENERATING, OR CERTIFYING RANDOMNESS

(71) Applicant: Cambridge Quantum Computing Limited, London (GB)

(72) Inventors: Fernando Guadalupe dos Santos Lins Brandão, Pasadena, CA (US); David John Worrall, Worcester Park (GB); Simone Severini, London (GB)

(73) Assignee: Cambridge Quantum Computing Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,905

(22) Filed: Jun. 28, 2021

(65) Prior Publication Data

US 2021/0326119 A1   Oct. 21, 2021

Related U.S. Application Data

(63) Continuation of application No. 16/206,980, filed on Nov. 30, 2018, now Pat. No. 11,080,021.
(Continued)

(51) Int. Cl.
*G06F 7/58* (2006.01)
*H01L 49/00* (2006.01)
(Continued)

(52) U.S. Cl.
CPC ............. *G06F 7/588* (2013.01); *G06F 7/00* (2013.01); *G06F 7/58* (2013.01); *G06N 10/00* (2019.01);
(Continued)

(58) Field of Classification Search
CPC .. G06F 7/58–588; G06N 10/00; H01L 49/006; H04L 9/0852; H04L 9/06–0668
See application file for complete search history.

(56) References Cited

U.S. PATENT DOCUMENTS 7,844,649 B2    11/2010  Fiorentino et al.
7,849,122 B2 *  12/2010  Fiorentino ............ H04L 9/0858
                                                  708/256
(Continued)

FOREIGN PATENT DOCUMENTS

WO       WO 17/058194       4/2017

OTHER PUBLICATIONS

Aiello, A. et al., "Unravelling Two-Photon High-Dimensional Entanglement", arXiv reprint, Aug. 4, 2005.
(Continued)

*Primary Examiner* — Emily E Larocque
*Assistant Examiner* — Carlo Waje
(74) *Attorney, Agent, or Firm* — Knobbe Martens Olson & Bear, LLP

(57) ABSTRACT

A security test logic system can include a non-transitory memory configured to store measurements from a measurement apparatus, the measurement outputs comprising indications of presence or absence of coincidences where particles are detected at more than one detector at substantially the same time, the detectors being at the end of different channels from a particle source and having substantially the same length. The system can include a processor configured to compute a test statistic from the stored measurements. The test statistic may express a Bell inequality, and the system can compare the test statistic with a threshold. The processor can be configured to generate and output a cer-
(Continued)

tificate certifying that the measurements are from a quantum system if the value of the computed test statistic passes the threshold.

25 Claims, 17 Drawing Sheets

Related U.S. Application Data

(60) Provisional application No. 62/607,719, filed on Dec. 19, 2017.

(51) Int. Cl.

| | | |
|---|---|---|
| *G06N 10/00* | (2019.01) | |
| *H04L 9/08* | (2006.01) | |
| *G06F 7/00* | (2006.01) | |
| *H04L 9/06* | (2006.01) | |

(52) U.S. Cl.
CPC .......... *H01L 49/006* (2013.01); *H04L 9/0662* (2013.01); *H04L 9/0852* (2013.01)

(56) References Cited

U.S. PATENT DOCUMENTS

| | | | |
|---|---|---|---|
| 9,471,279 B2 | 10/2016 | Shi et al. | |
| 9,471,280 B2 | 10/2016 | Shi et al. | |
| 11,080,021 B2 | 8/2021 | Brandao et al. | |
| 2006/0115086 A1 | 6/2006 | Beausoleil et al. | |
| 2006/0288062 A1 | 12/2006 | Luo | |
| 2009/0016386 A1 | 1/2009 | Edamatsu | |
| 2013/0258453 A1 | 10/2013 | Arahira | |
| 2014/0126030 A1 | 5/2014 | Crespi et al. | |
| 2015/0199178 A1* | 7/2015 | Shi .................. | G06F 7/588 708/254 |
| 2015/0200778 A1* | 7/2015 | Shi .................. | G06F 7/582 380/46 |
| 2017/0091649 A1 | 3/2017 | Clarke et al. | |
| 2019/0243611 A1 | 8/2019 | Martin | |
| 2019/0258458 A1* | 8/2019 | Walmsley ......... | G06N 10/00 |
| 2020/0301670 A1 | 9/2020 | Thornton | |
| 2021/0141609 A1 | 5/2021 | Huang | |

OTHER PUBLICATIONS

Bierhorst, P. et al., "Experimentally generated random numbers certified by the impossibility of superluminal signaling", arXiv preprint, Feb. 16, 2017.
Brandao, Fernando G.S.L. et al., "Efficient Quantum Pseudorandomness", Phys. Rev. Lett., vol. 116, Issue 17, Apr. 29, 2016, 6 pages.
Brandao, Fernando G.S.L. et al., "Realistic noise-tolerant randomness amplification using finite number of devices," Nature Communications 7:11345, Apr. 21, 2016, 46 pages.
Brandao, Fernando G.S.L. et al., "Robust Device-Independent Randomness Amplification with Few Devices", arXiv: 1310.4544v2 [quant-ph], Mar. 25, 2015, 36 pages.
Brandao, Fernando G.S.L. et al., "Robust Device-Independent Randomness Amplification with Few Devices", arXiv:1310.4544v1 [quant-ph], Oct. 16, 2013, 23 pages.
Chattopadhyay, Eshan et al., "Explicit Two-Source Extractors and Resilient Functions", ECCC—Electronic Colloquium on Computational Complexity, STOC '16 Proceedings of the forty-eighth annual ACM symposium on Theory of Computing, Jun. 19-21, 2016, 34 pages.
Christensen, B.G. et al., "Detection-Loophole-Free Test of Quantum Nonlocality, and Applications", Physical Review Letters, vol. 111, No. 13,130406, Sep. 27, 2013.

Cirac J.I., et al. "Quantum computations with cold trapped ions," Physical review letters, May 15, 1995, vol. 74, No. 20, pp. 4091-4094.
Collantes et al. on "Quantum Random Number Generators" in Review of Modern Physics, vol. 89. Retrieved on [Jun. 10, 2020], Retrieved from the Internet <https://journals.aps.org/rmp/pdf/10.1103/RevModPhys.89.015004> (Year: 2017).
Horodecki, K., et al., "Amplifying the randomness of weak sources correlated with devices," arXiv:1601.06455v1 [quant-ph], Jan. 25, 2016, 30 pages.
ID Quantique White Paper, "Random Number Generation Using Quantum Physics", Version 3.0, Apr. 2010, 8 pages.
Knill, Emanuel, et al., "A scheme for efficient quantum computation with linear optics." *Nature*, vol. 409, No. 6816, Jan. 4, 2001, 18 pages.
Li, Xin, "Improved Constructions of Two-Source Extractors", arXiv:1508.01115, Aug. 5, 2015, 13 pages.
Ma, Xiongfeng et al., "Postprocessing for quantum random-number generators: entropy evaluation and randomness extraction", Phys. Rev. A. vol. 87, Issue 6, dated Jun. 22, 2013, 13 pages.
Monras et al. Inductive supervised quantum learning, arXiv; 1605.07541 2017 (retrieved on Aug. 3, 2019). Retrieved from the Internet: <URL: https://pdfs.semanticscholar.org/acd1/635b586846e8b3642058835276eaff468c67.pdf 12> entire document.
Monras, Alex et al., "Inductive supervised quantum learning," Phys. Rev. Lett. 118, 190503, May 12, 2017, 16 pages.
Pironio et al. "Random Numbers Certified by Bell's Theorem". Retrieved on [Feb. 11, 2020], Retrieved from the Internet <https://arxiv.org/pdf/0911.3427.pdf> (Year: 2010).
Pritchard, Jonathan D., et al., "Nonlinear optics using cold Rydberg atoms," Annual Review of Cold Atoms and Molecules, vol. 1., Feb. 2013. pp. 301-350.
Ramanathan, Ravishankar et al., "Randomness amplification against no-signaling adversaries using two devices", Phys. Rev. Lett. 117, 230501, dated Apr. 23, 2015, 14 pages.
Ramanathan, Ravishankar et al., "Robust Device Independent Randomness Amplification", arXiv: 1308.4635v1 [quant-ph], dated Aug. 21, 2013, 17 pages.
Rudolph, Terry, "Why I am optimistic about the silicon-photonic route to quantum computing", Department of Physics, Imperial College London, London SW7 2AZ, United Kingdom, Jul. 29, 2016, 14 pages.
Santha, M, et al., "Generating quasi-random sequences from semi-random sources," Journal of computer and system sciences, vol. 33, No. 1, Aug. 1986, pp. 75-87.
Santha, M., et al., "Generating quasi-random sequences from slightly-random sources," in 25th Annual Symposium on Foundations of Computer Science, Oct. 24, 1984 Oct. 24, pp. 434-440.
Shalm, L.K. et al., "Strong loophole-free test of local realism", Physical Review Letters, vol. 115, No. 25, 250402, Dec. 18, 2015.
Wikipedia, "Hardware random number generator," downloaded Dec. 2016, 7 pages.
Invitation to Pay Additional Search Fees in corresponding International Patent Application No. PCT/US2018/063481, dated Jan. 9, 2019, 2 pages.
International Search Report and Written Opinion in corresponding International Patent Application No. PCT/US2018/063481, dated Mar. 21, 2019, 12 pages.
International Search Report and Written Opinion in International Patent Application No. PCT/US2020/037805, dated Sep. 16, 2020, 8 pages.
Colbeck et al., May 16, 2011, Free randomness can be amplified, arxiv.org, Cornell University Library, 10 pp.
Ma et al., May 10, 2016, Quantum random number generation, https://arxiv.org/pdf/1510.08957.pdf, 32 pp.
Pivoluska et al., Feb. 23, 2015, Device independent random number generation, Acta Physica Slovaka, arxiv.org, Cornell University Library, pp. 600-663.
Extended European Search Report dated Aug. 2, 2021, in patent application No. 18893103,4, 8 pp.

* cited by examiner

AMPLIFYING, GENERATING, OR CERTIFYING RANDOMNESS

CROSS-REFERENCE TO RELATED APPLICATIONS

This application is a continuation of U.S. patent application Ser. No. 16/206,980 filed on Nov. 30, 2018, entitled "Amplifying, Generating, or Certifying Randomness", which claims the benefit of priority to US provisional patent application number U.S. 62/607,719, filed on Dec. 19, 2017, entitled "Systems and Methods for Amplifying, Generating, or Certifying Randomness," which are hereby incorporated by reference herein in its entirety.

BACKGROUND

Encryption and authentication used in computer security use random bit generators since random numbers are important in the generation of symmetric keys and nonces that make up part of encryption and authentication processes. Ways of generating random bit sequences are typically grouped into three different types including: deterministic random bit generators which generate pseudo random bit sequences using software; non-deterministic random number generators based on classical physics; and non-deterministic random number generators based on quantum systems.

SUMMARY

The following presents a high-level overview of the disclosure, simplified in some respects, as a prelude to the more detailed description presented later. This summary is not intended to identify key features or essential features of the claimed subject matter; nor is it intended to be used to limit the scope of the claimed subject matter.

In one embodiment, a security test logic system has a non-transitory memory configured to store measurements from a measurement apparatus, the measurement outputs comprising indications of presence or absence of coincidences where particles are detected at more than one detector at substantially the same time, the detectors being at the end of different channels from a particle source and having substantially the same length. The system includes a processor configured to compute a test statistic from the stored measurements. The test statistic may express a Bell inequality, and the system can compare the test statistic with a threshold. The processor can be configured to generate and output a certificate certifying that the measurements are from a quantum system if the value of the computed test statistic is, for example, below the threshold. A Bell inequality can comprise any inequality used to determine whether a set of measurements is consistent with quantum mechanics or consistent with classical physics. A Bell inequality includes any of Bell's original inequalities, a CHSH inequality (Clauser Home Shimony Holt inequality), or any other such inequality. Violation of a Bell inequality demonstrates that the measurement is consistent with the rules of quantum mechanics and inconsistent with the rules of classical physics.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings.

Like reference numerals are used to designate like parts in the accompanying drawings. The drawings provided are not necessarily to scale and are provided to illustrate example embodiments described herein and are not intended to limit the scope of the disclosure.

DETAILED DESCRIPTION

Figure 1:
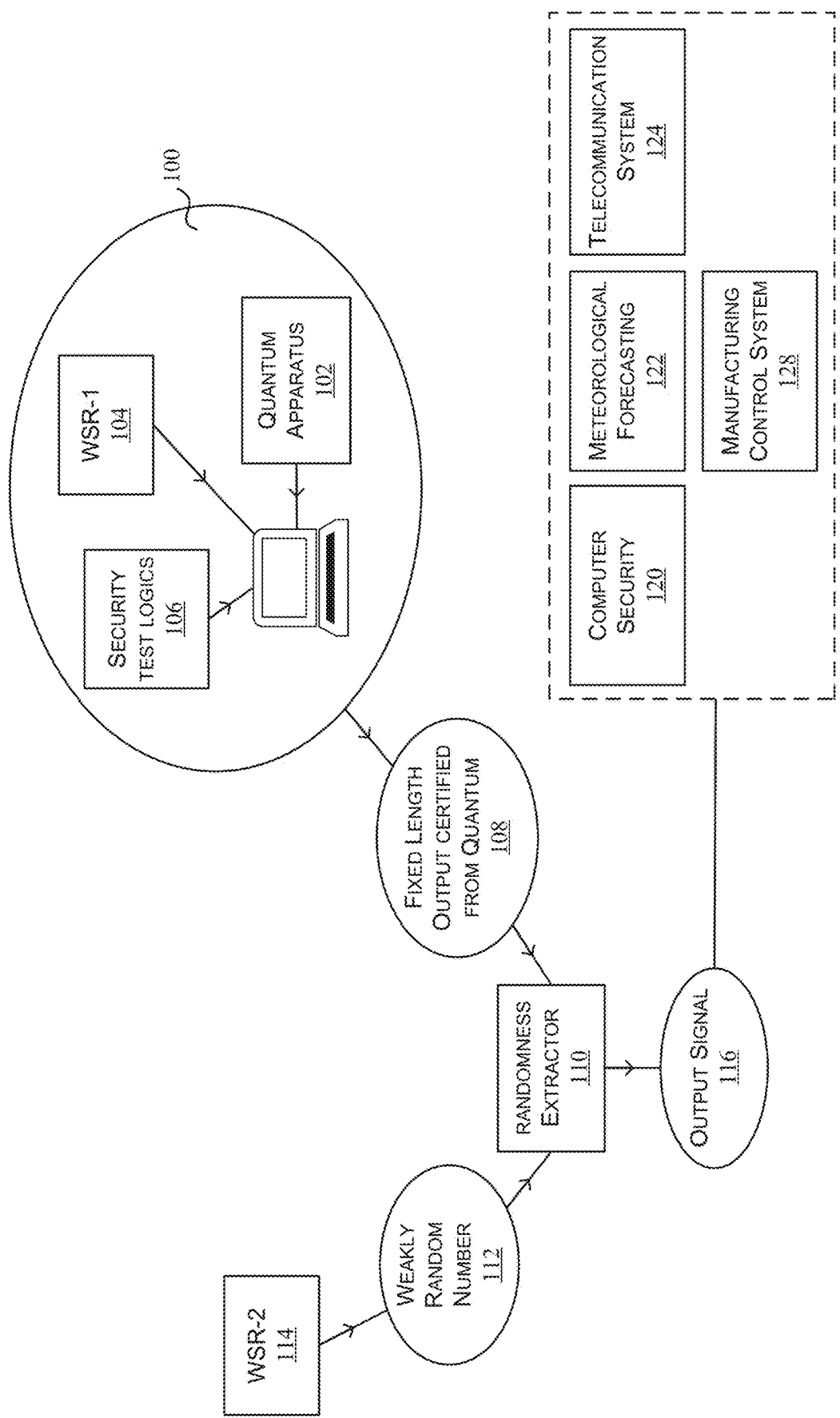
FIG. 1 is a schematic diagram of an example of an apparatus for certifying that a number has been produced by a quantum apparatus and of an example of a randomness extractor configured to generate a random number for use in a variety of downstream applications.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Random bits have too many applications to enumerate, ranging from cryptography to gambling and scientific computing. However, traditional random number generators are based on classical physics, which is deterministic. Therefore, the output randomness cannot be trusted without further assumptions, since the apparent randomness is based on ignorance that may not be shared by an adversary. Random-seeming numbers generated by any sort of deterministic software are in principle vulnerable to hacking for this reason. Quantum mechanics is intrinsically probabilistic and therefore might be used to generate randomness. Leveraging quantum mechanics to generate a random number might allow for a type of security based on the uncertainty principle; for example, under the right conditions, an adversary might not be able to observe a quantum bit (qubit) without the qubit being immediately destroyed.

When considering a device that purportedly generates random output based on quantum mechanics, one might be able to trust that the output is random only if one trusts or assumes the quantum device is operating correctly. Once a random number has been generated by a system there is typically no easy way to certify that the random number has been generated by a quantum system. To determine whether a purportedly quantum system in fact leverages quantum phenomena to produce its output, a human operator typically would not only need to be an expert in the field but also need to visually inspect the internal structure, including mechanical apparatus, of the purportedly quantum system and perhaps even independently test the system.

The embodiments described below are not limited to implementations which solve any or all of the disadvantages of known technology for amplifying, generating or certifying randomness. For example, different embodiments may address different disadvantages or challenges relating to amplifying, generating, or certifying randomness.

While there exist commercialized quantum systems that produce purportedly random bits, to verify that such a device is working as intended would be a difficult task even for an expert with access to the device's internal workings. It would be preferable, then, if the device's output could be verified as genuine merely by considering the output, without any knowledge of the inner workings of the device. This property is known as device independence.

In the following detailed description, various non-limiting examples of a randomness amplifying process and various embodiments of real-world systems that implement examples of the process are described. These examples and embodiments are intended to illustrate, but not to limit, the scope of the disclosure.

FIG. 1 is a schematic diagram of an example of an apparatus 100 for certifying that a number has been produced by a quantum apparatus 102 in an independent manner, and of an example randomness extractor 110 configured to generate a random number 116 for use in a variety of downstream applications 120, 122, 124, 128. The randomness extractor receives input from a weak source of randomness 114 (denoted here and in the figure as WSR-2), which can be a classical apparatus for computing a pseudo-random number. In addition, the apparatus 100 also has a weak source of randomness 104 (denoted here and in the figure as WSR-1), which can be a classical apparatus for computing a pseudo-random number.

A weak source of randomness refers to a source of randomness where the randomness is not certifiable as the result of, or being based on the presence of, quantum effects. The term "weak" does not itself connote that the source of randomness is somehow unsuitable or insufficient to meet industry standards of randomness. In some implementations, a weak source of randomness can be at least partly nondeterministic or even fully nondeterministic. Weak sources of randomness thus include sources that output noncertifiable nondeterministic random numbers. Weak sources of randomness are sometimes referred to simply as sources of randomness.

The quantum apparatus 102 comprises apparatus for generating a plurality of qubits and preparing the qubits in a particular quantum state, as well as apparatus for measuring the qubits in at least two different bases. The apparatus 100 has security test logics 106 for automatically certifying that a given plurality of qubit measurements 108 has violated a Bell inequality.

As used herein, a Bell inequality refers generally to any inequality associated with measurements of quantum or classical systems, where violation of the inequality means that the measurements are consistent with the rules of quantum mechanics (e.g., entanglement or non-locality) and inconsistent with the rules of classical physics (e.g., local realism or hidden variables). A Bell inequality includes an inequality that is always satisfied by any local probability distribution for the measurement results of two parties, which is one that can be realized when each party's device has its own internal state. A Bell inequality includes any of the original inequalities derived by John Stewart Bell as well as inequalities derived by others such as, for example, a CHSH inequality (Clauser Horne Shimony Holt inequality), a Leggett inequality, a Leggett-Garg inequality, and so forth. As further described herein, the violation of a Bell inequality guarantees that the output of the quantum apparatus 102 is from quantum effects, and therefore is independent of other sources including, e.g., a classical weak source of randomness.

Certifying that the qubit measurements 108 violate a Bell inequality indicates that the qubit measurements have been produced due to quantum effects, rather than classical effects, and it also indicates that the qubit measurements 108 are independent of any other classical weak source of randomness, such as WSR-2 114 in FIG. 1 and WSR-1 104. In this sense, certifying that qubit measurements 108 have been produced due to quantum effects certifies that the qubit measurements 108 are truly random. The certificate allows a user to trust the randomness of the output without access to the internals of the quantum apparatus 102 (and thus, e.g., without arranging for an expert to inspect the internal structure of the quantum apparatus 102 and test it).

The security test logics 106 can be implemented using any combination of one or more of: software, firmware, or hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs), Central Processing Units (CPUs), or any other type of hardware processor.

In the embodiment shown in FIG. 1, the set of qubit measurements 108 is of a fixed size that may not be appropriate for use in downstream applications 120, 122, 124, 128. Therefore, a randomness extractor is used in some embodiments to compute a number of appropriate size/length. Once a plurality of qubit measurements 108 has been obtained and certified as produced by quantum effects, the measurements 108 are input to a randomness extractor 110. Classical randomness extractors such as, e.g., Trevisan's extractor may be used. In some such embodiments, the randomness extractor 110 takes as input a pseudo-random number 112 from a weak source of randomness 114 as well as the certified qubit measurements 108. The randomness extractor computes a number as output which may be of any specified length. The number produced by the randomness extractor 110 has amplified randomness as compared with the pseudo random number 112 and is truly random because the inputs to the randomness extractor are certified as being independent of one another as explained in more detail below.

In some embodiments, the number with amplified randomness 116 is input to one or more downstream applications. A non-exhaustive list of examples of downstream applications includes: computer security 120, where random numbers are often used as one-time pads (OTPs) that are pre-shared between entities and used for encryption; meteorological forecasting 122, where random numbers are sometimes generated and used to initialize values of parameters of weather system models; a telecommunication system 124, where random numbers are sometimes generated and used for resource allocation schemes; and a manufacturing control system 128, where random numbers are sometimes generated and used to model noise present in sensor readings.

In light of results such as those developed by Santha and Vazirani 1986 "Generating quasi-random sequences from slightly-random sources" in Journal of Computer and System Sciences, 33, 41): 75-87, classical methods of random number generation typically assume access to two independent sources of randomness and use a randomness extractor to compute nearly ideal random bits. However, an assertion that two sources of randomness are independent generally must rely on further assumptions. This is one of the main drawbacks of such classical methods; it is generally not possible to guarantee the two weak sources of randomness are independent, so such classical methods are not device-independent.

In contrast, the present technology is able to guarantee independence of the quantum apparatus 102 and WSR-2, the classical weak source of randomness 114. The violation of a Bell inequality guarantees that the output of the quantum apparatus 102 is from quantum effects, and therefore is independent of other sources including WSR-2, the classical weak source of randomness 114. Thus the randomness extractor 110 takes input from two sources which are certified as being uncorrelated sources. In this sense, the output signal 116 of the randomness extractor is truly random.

Commercialized quantum randomness generators have hitherto not displayed certifiable device independence since a human operator needs to inspect the randomness generator and confirm that it is using quantum mechanics. Such devices use a quantum prepare-and-measure scenario to exploit the operationally probabilistic nature of quantum mechanics to create strings of random numbers that are preferable in a number of ways to classical pseudo-random number generation methods. Commercialized quantum randomness generators perform measurements in a single quantum context in a way that makes them unsuitable for a device-independent realization. Existing quantum randomness generators are without any guarantees of security, and to verify that the devices are working as specified can be difficult, even for an expert. For example, in certain previously developed photonics-based systems, it is hard to verify that the reported measurement outcomes are genuine, given that measurement of the photon system destroys the photon as it is incident on the detector: in the absence of a guarantee that reported measurement outcomes are due to quantum effects, the device could be yielding a pre-generated, yet apparently random, string of bits that is known to an adversary.

Many existing quantum-based randomness generators offer a security guarantee where the guarantee is valid only if the device is discarded after each round of measurement, or only if a very large number of devices are used in parallel (growing with the number of random bits produced). These approaches are not good candidates for a commercial device.

Many existing quantum randomness generators are not tolerant to realistic noise levels from feasible quantum devices, and therefore are not a good candidate for practical uses.

An advantageous aspect of the apparatus 100 is its robustness to noise: the security test logic works correctly (and does not abort) provided merely that the quantum state and the quantum measurements that compose the quantum device have a low level of noise. In particular, the apparatus 100 is able to operate and certify its output even if the different quantum systems of quantum apparatus 102 are only approximately non-signaling and not strictly non-signaling. Implementing strictly non-signaling quantum systems within a single device is unlikely to be practical.

Various embodiments of a four-device and two-device quantum apparatus 102 described in this document are unique in their design and application. They use quantum systems to achieve results not feasible using classical resources. The embodiments described herein are realistically implementable for practical day-to-day use. The embodiments use a small, fixed number of quantum devices and are tolerant to realistic levels of noise in the quantum devices. In addition, the quantum states are produced by quantum circuits requiring only a few gates and with low circuit depth.

An apparatus 100 that is able to both generate true randomness and also certify in a device independent way that it is working as intended and producing random bits offers distinct advantages over a weak source of randomness in any environment in which an attack on random bits by an adversary is even a remote possibility. In addition, the ability to certify random numbers is expected to be important for legislative reasons in the financial industry. When Monte Carlo simulation models are used to calculate forecasts, currently the initial pseudorandom seeds used typically must be submitted to a regulator, but previously there has been no effective way to prove that these seeds were indeed chosen at random and were not, for example, chosen to influence the results in a particular way. The present apparatus 100 produces the required random bits alongside a certificate 108 of the presence of quantum effects and, in this sense, a certificate of true randomness. We describe various non-limiting examples of a process to amplify any weak source of randomness into a nearly ideal source of randomness using quantum-mechanical systems. The process has the following key distinguishing features:

The apparatus 102 gives the benefit of being device independent, meaning that the user does not have to trust the inner working of the device. This is because the security test logics, which perform statistical tests on the input/output of the device, give the user a certification that the output bits 108, 116 are indeed random. Apart from offering a certificate of randomness, the apparatus 102 is additionally secure in the sense that the output bits 108, 116 are unknown to anyone else apart from the user. The security or correctness given by the apparatus 100 does not rely on any computational complexity assumptions and, in at least this sense, is unconditional. The only assumption used for proving the correctness and security of certain embodiments of the apparatus 100 is that there cannot be any signaling from the device to non-trusted parties (such as an Eavesdropper). This is guaranteed, where appropriate, by shielding the device. The apparatus 100 avoids the need for a non-signaling assumption between the different parties of the device, in stark contrast with early work on device-independent randomness generation. This is achieved by introducing a new test (security test B) which passes even when the individual quantum systems are only approximately non-signaling. The apparatus is optionally used with classical random number generators, or classical pseudo-random generators. Because the output bits are completely independent of any other source of randomness in the universe, they are optionally used as a seed to a classical randomness extractor to generate a much larger sequence of random bits. This allows for substantially higher bit rates.

The apparatus 100 operates with around linear runtime on the length of the final bit string. In various examples, the apparatus uses 2 or 4 separated (approximately non-signaling) quantum devices to produce any number of random bits.

Figure 2A:
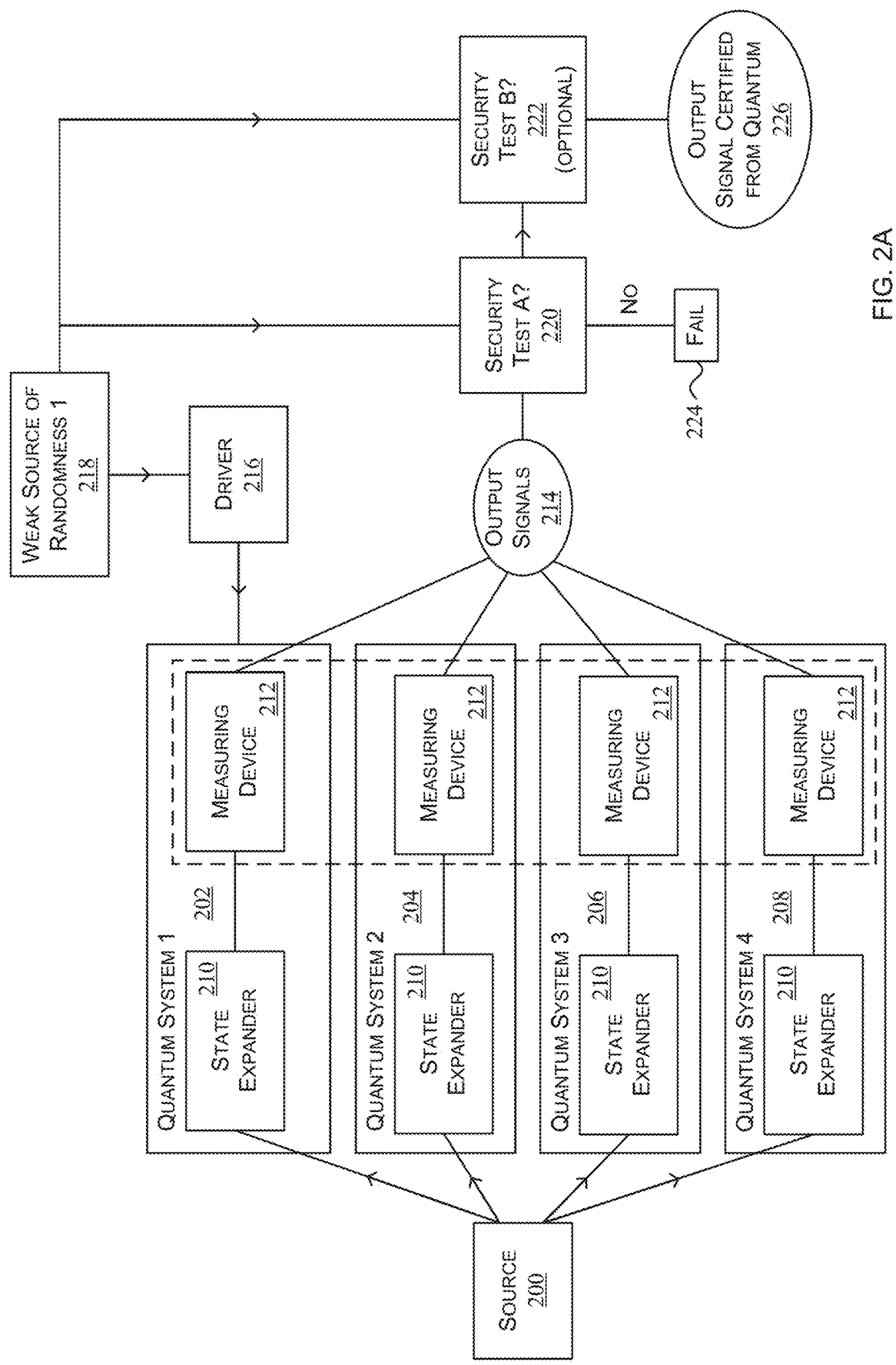
FIG. 2A is a schematic diagram of an example of a four-device quantum apparatus that may be used in the apparatus of FIG. 1.

FIG. 2A is a schematic diagram of an example four-device quantum apparatus for use as the quantum apparatus 102 of FIG. 1. It is also possible to use a two-device quantum apparatus (see, e.g., FIG. 3A) as the quantum apparatus 102 of FIG. 1. A benefit of the four-device quantum apparatus in this embodiment is that it is secure against attacks by an adversary using a convex mixture of a Popescu-Rohrlich (PR) box and a local distribution, whereas the two-device quantum apparatus is not. In at least some embodiments, the four-device quantum apparatus uses a simpler security test that the two-device quantum apparatus. Also, in at least some two-device embodiments, the two-device quantum apparatus prepares the qubits into a different quantum state than in the four-device quantum apparatus of at least some four-device embodiments. In at least some two-device embodiments, the two-device quantum apparatus gives sensor measurements that are certifiable as being from quantum effects, where the correctness of quantum mechanics is assumed as an axiom of the process for computing the certification. In at least some four-device embodiments, the validity of the certificate does not rely on the correctness of quantum mechanics as an axiom.

With reference to the example embodiments illustrated in FIG. 2A, there is an energy source 200 for emitting qubits and there are four quantum systems 202, 204, 206, 208 which receive input from the energy source 200. Each quantum system comprises a state expander 210 that prepares a qubit into a specified quantum state. Each quantum system comprises a measuring device 212 that detects qubits in one or more measurement bases. The measurement bases of the measuring devices 212 are configurable by a driver 216 according to pseudo-random values of measuring device settings generated by a weak source of randomness 218. The measuring devices 212 detect qubits received from the source 200 via the respective state expander 210.

The source 200 produces pairs of qubits each sent along a different channel. A channel can comprise a path from the source 200 through a state expander 210 to a detector in a measuring device 212. The paths are of substantially the same length so that the time taken for a qubit to travel along each path is substantially the same.

Emerging signals from each path are detected at detectors in the measuring device 212, and coincidences are identified. A coincidence can include detection of a qubit at more than one of the detectors at substantially the same time. For example, a coincidence can include detection of a qubit at two or more detectors in a specified time period. The specified time period can depend, at least partly, on flux of the pairs of qubits produced by the source 200. The specified time period may tend to be inversely related to the flux, e.g., the specified time period may be shorter when the flux of pairs of qubits is large (e.g., where there may be many detections per unit time), and the specified time period may tend to be longer when the flux of pairs of qubits is small (e.g., where there may be fewer detections per unit time). In some embodiments, the specified time period is in a range from about 1 ns to 1 µs, 1 µs to 1 ms, 1 ms to 0.1 s, or some other range. For example, the time period can be in a range of 5 to 15 ns, e.g., about 10 ns.

In some embodiments, an event where a qubit is detected is represented by a 1 (one) and an event where a qubit is not detected is represented by a 0 (zero). In this way the measuring devices 212 generate output signals 214 comprising a bit string. However, it is not essential to use a binary representation, and other representations are used for the output signals 214 in some embodiments.

The output signals 214 are checked using security test A 220 and optionally security test B. Security tests A and B are implemented using hardware in a preferred embodiment since hardware is typically more secure than software or firmware. However, it is not essential to implement security tests A and B using hardware only.

Security test A checks whether the output signals 214 are from quantum effects or from classical effects by testing for violation of a Bell inequality. If security test A is passed there is certification 226 that the output signals 214 are from quantum effects and in this sense truly random. If security test A is failed 224 then there is no certification and the output signals 214 are discarded. Because the source 200 and the quantum systems 202, 204, 206, 208 may be subject to noise, particles prepared in the quantum systems might not always be qubits and might sometimes be classical particles. Therefore security test A is particularly beneficial because it gives robustness to noise (since it is a statistical test over many observations of detections of particles at detectors of the measuring devices) in addition to giving the ability to certify the output signals 214 as being quantum or not, without the need to inspect the innards of the quantum systems 202, 204, 206, 208.

Security test A involves monitoring emerging signals from each channel. For each detector, there is a unique path or channel that qubits may follow from the source 200 to the detector and the paths are arranged to be substantially the same length so that an entangled qubit in a superposition of states will reach multiple specified ones of the detectors at substantially the same time. The paths are configured to accept only qubits in particular polarizations and/or modes. By comparing times at which particles are detected at the detectors, it is possible to infer whether the particles are qubits with entanglement and superposition, or whether the particles are classical. More formally, in at least some embodiments, the security test A comprises measuring violation of a Bell inequality through the observations of the times at which particles are detected at different ones of the detectors.

Some four-device embodiments will now be described over the next several paragraphs without repeating at each step phrases such as "in some embodiments." The four quantum systems 202, 204, 206, 208 are four spatially separated parties with measurement settings $\{u_1, u_2, u_3, u_4\}$ and respective outcomes $\{x_1, x_2, x_3, x_4\}$. Each of the four quantum systems has a specified two-dimensional Hilbert subspace that is amenable to quantum control; each system is capable of storing one qubit. The physical realization of the qubit and its measurement apparatus follows one of many possible designs, including linear optics, ion traps, and superconducting qubits.

A Bell inequality includes an inequality that is always satisfied by any local probability distribution for the measurement results of two parties, which is one that can be realized when each party's device has its own internal state. This state may be correlated with the state held by the other party, but each of the systems they hold has its own separate description without the need to describe the pair of ensembles holistically. This means that in principle the apparent randomness found by measuring one of the subsystems can be thought of as stemming from ignorance about what state the subsystem is really in. However, entangled states in quantum mechanics give rise to probability distributions that are nonlocal. Since such distributions cannot be thought of as being caused by ignorance of what state each subsystem is in, since the subsystem cannot really be said to be in any state at all: the state must be described holistically. This is what opens the door to the possibility of true randomness, and hence the present technology seeks to measure the violation of a Bell inequality in order to be able to certify random bits are output as the measurements from the measurement devices. While it is impossible to violate a Bell inequality classically, pure entangled quantum states, for specially selected measurements, can be found to violate one without any loopholes.

Security test B is optional and it checks whether the quantum systems are non-signaling (that is, the quantum systems 202, 204, 206, 208 do not influence one another). Security test B is performed after security test A since security test B is concerned with non-signaling nature of the quantum systems when they operate as quantum systems and not with regard to any classical particles travelling through the quantum systems as a result of noise. Security test B involves making repeated measurements with the measuring devices 212 and testing to see if the measurement results are correlated between the quantum systems, even where the measurement bases are set in a way which is partly correlated between the measurement devices.

Figure 2B:
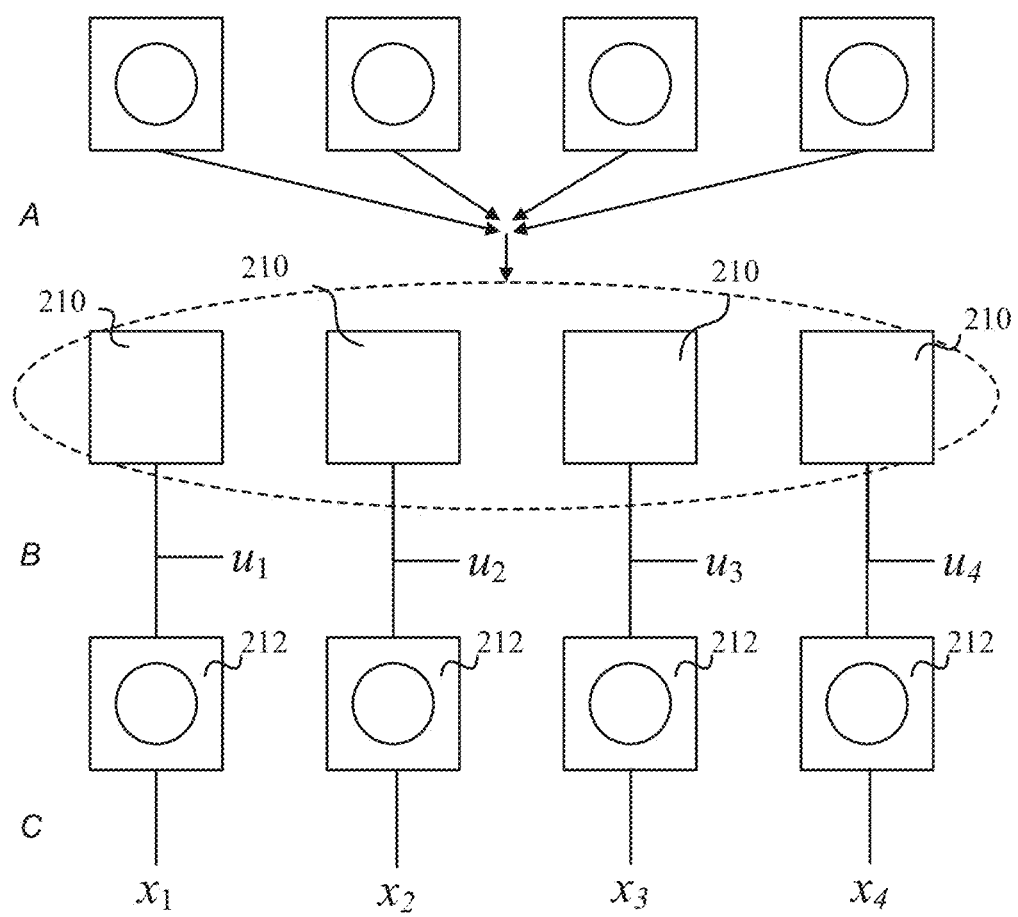
FIG. 2B is another schematic diagram of the four-device quantum apparatus of FIG. 2A.

FIG. 2B is another schematic diagram of the four-device quantum apparatus of FIG. 2A. The four state expanders are depicted as boxes 210 and these receive as input quantum particles represented by circles inside squares. Each state expander 210 is attached to a measurement device 212.

A method of operation at the four-device quantum apparatus of FIG. 2B comprises, in an operation A, making the state expanders attached to each measurement apparatus interact with one another by preparing the state of the quantum particles in the state expanders. This is represented in FIG. 2B by the dotted line around the boxes 210. This may be a probabilistic interaction rather than a deterministic interaction, in which case the process of preparing the state does not have fixed length.

In an operation B, once the correct entangled quantum state is prepared, the inputs $U_i$ are given to the four measurement apparatuses, and the quantum systems are measured. The inputs $U_i$ are measurement settings which are selected using a weak source of randomness and which are used to set measurement bases at the measurement devices 212. The measurement results are output (operation C) by the measurement device 212 as indicated by the symbols $X_i$ in FIG. 2B.

Operations A to C shown in FIG. 2B are repeated. There is no interaction between the boxes between the $U_i$ being input, and the $X_i$ being output. Note that between operations A and B, the system is in a state that cannot be described as made up of individual states for its subsystems: the system is therefore described holistically between operations A and B.

Figure 2C:
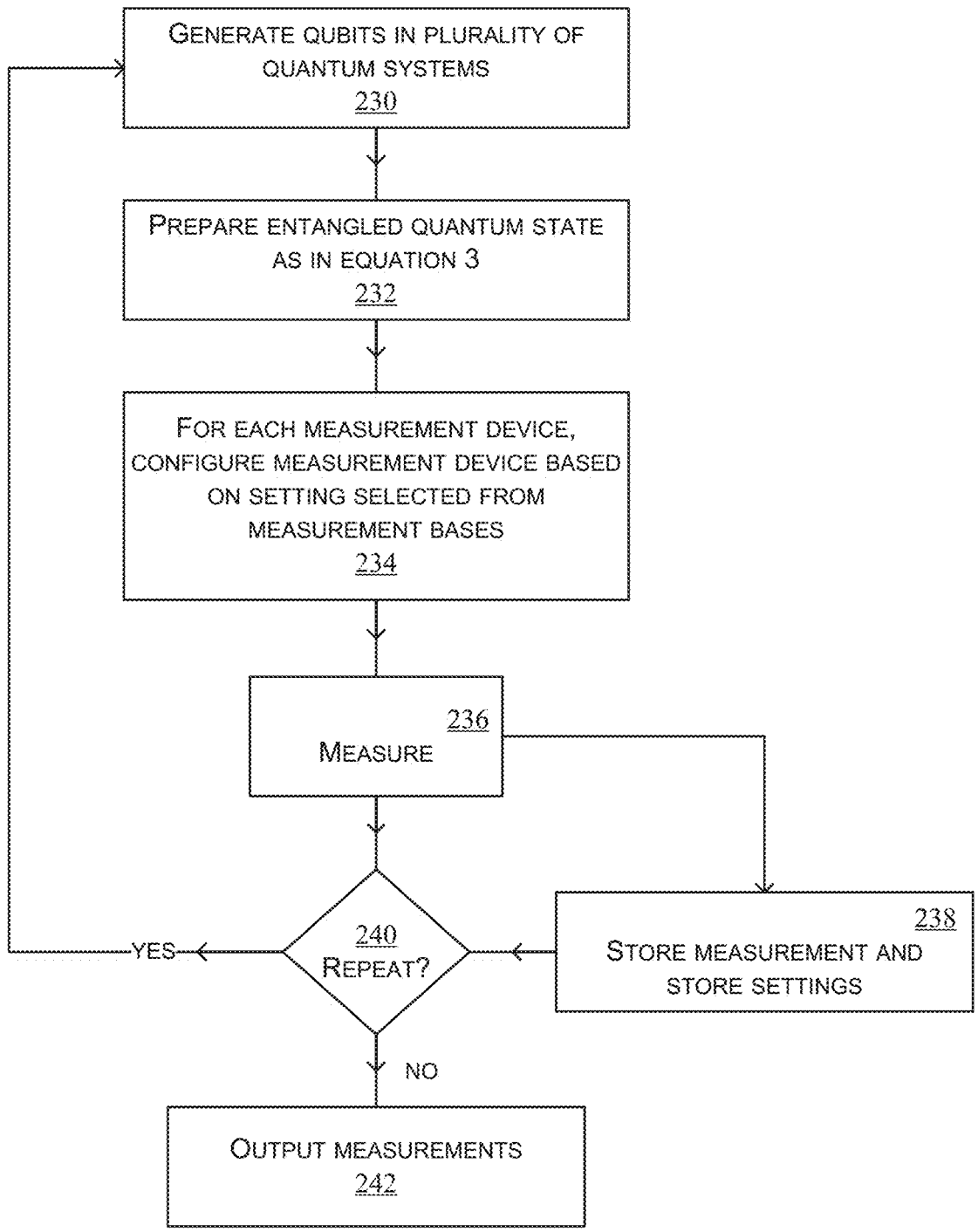
FIG. 2C is a flow diagram of an example method of operation of a four-device quantum apparatus such as shown in FIG. 2A or FIG. 2B.

FIG. 2C is a flow diagram of a method of operation of the four-device quantum apparatus of FIG. 2A and FIG. 2B. Qubits are generated 230 in a plurality of quantum systems such as four quantum systems. The qubits are prepared 232 in specific entangled quantum states, for example, as indicated in equation 3 below. This can be done using the state expanders. The four qubits are prepared so they interact, in order to produce the specified quantum state for the device, which is of a type called an entangled state. This utilizes both two-qubit and single-qubit interactions. Settings of the measurement devices are configured 234 using input from a weak source of randomness. The weak source of randomness is used to configure settings independently for each measurement device 212. These settings are derived from the measurement bases used in the method of operation. For example, the weak source of randomness can be used to select a measurement setting from two measurement bases (e.g., the computational basis and Hadamard basis, which may each have two basis states or basis vectors) for each of four measurement devices 212. The measurement settings are used to 234 configure settings of the measurement devices. Each of the four qubits is measured according to its measurement setting. This may involve a change being made to the setting of detectors or transformation being applied to a qubit on a channel of a measurement device, depending on the precise implementation of the quantum device. Then, the qubit is measured. It is of note that this effectively destroys the quantum state. The detector then outputs a bit that contains the result of the measurement, $x_1$, and the next round of measurement begins. In an example, the settings include two possible orthogonal polarizations (such as horizontal and vertical) and two possible qubit modes. Once the settings have been configured, detectors in the measurement devices begin to sense detected particles received on the paths from the source to each detector. The measurement process 236 produces measurement results which are stored 238 together with the associated values of the settings of the measurement devices at the time of the measurement. A check is made 240 as to whether to repeat to obtain more measurements. The check involves checking criteria such as whether a specified time has elapsed, whether a specified number of measurement iterations has passed or whether a memory storing the measurements is full. Once the check at operation 240 indicates that no further repetitions are needed the stored measurements are output 242.

Further details of at least some four quantum device embodiments are now given.

Consider two strings of measurement settings given by:
$U_0=\{\{0001\}, \{0010\}, \{0100\}, \{1000\}\}$ and
$U_1=\{\{0111\}, \{1011\}, \{1101\}, \{1110\}\}$,
where $U_0$ is a set of four possible measurement settings and $U_1$ is a different set of four possible measurement settings.

A Bell inequality used in the embodiment is the following:

$$B \cdot \{P(x|u)\} = \sum_{x,u} B(x, u) P(x|u) \geq 2, \quad (1)$$

where B is an indicator vector for the Bell inequality and P(x|u) is the conditional probability distribution of the outcomes or measured values x given inputs or measurement setting values u.

In some embodiments, B is an indicator vector with $2^4 \times 2^4$ entries:

$$B(x, u) = \mathbb{1}_{\oplus_{i=1}^{4} x_i = 1} \mathbb{1}_{u \in U_0} + \mathbb{1}_{\oplus_{i=1}^{4} x_i = 0} \mathbb{1}_{u \in U_1} \quad (2)$$

where the indicator function $\mathbb{1}_E$ equals 1 if the expression E is true and equals 0 otherwise.

In some embodiments, the Bell inequality indicator function B is implemented with a 16-by-16 array or matrix whose entries are each zero or one. The columns of the array represent possible configurations of the detectors and the rows of the array represent possible observations at the detectors. In some embodiments, there are 16 possible configurations of the detectors since there are four measuring devices, each having four detectors. Instead of an array or matrix, many other data structures can be used, such as bitmaps, hash tables, lookup tables, or search trees. Data structures that permit fast searching or look-up are preferable in some embodiments, as in some embodiments the array or data structure is used as a lookup mechanism in which the combination of the four input bits and four output bits are effectively used as a key to look up a value for the Bell inequality indicator function.

An example of the array is given as follows: Let the four input bits of the device be $V_1, \ldots, V_4$ and the four outputs $S_1, \ldots, S_4$. Then the function $B(V, S)$ is defined as follows, where $\oplus$ denotes an XOR (exclusive or) operation:

$$B(V, S) = \begin{cases} 0 \text{ if } V \in U_0 \text{ and } S_1 \oplus S_2 \oplus S_3 \oplus S_4 = 0 \\ 1 \text{ if } V \in U_0 \text{ and } S_1 \oplus S_2 \oplus S_3 \oplus S_4 = 1 \\ 0 \text{ if } V \in U_1 \text{ and } S_1 \oplus S_2 \oplus S_3 \oplus S_4 = 1 \\ 1 \text{ if } V \in U_1 \text{ and } S_1 \oplus S_2 \oplus S_3 \oplus S_4 = 0 \\ 0 \text{ otherwise} \end{cases}$$

where $U_0$ and $U_1$ are defined above. Although there are 16 possible combinations of values of the detector settings, only 8 are used in this example for clarity. If, for example, the function $B(V, S)$ is implemented as an array or matrix, the remaining 8 values of the detector settings may be padded with zeros.

Let $V^i$ and $S^i$ be the vectors of inputs/outputs of the i-th round of the protocol. The security test is to compute:

$$B' = \frac{1}{n} \sum_{i=1}^{n} B(V^i, S^i)$$

The use of the Bell inequality indicator vector provides an efficient and accurate way of assessing coincidences observed at the detectors. If a coincidence is observed at detectors on different channels in the same measuring device then the coincidence is classical noise. If a coincidence is observed at detectors in different measuring devices of a pair of measuring devices, then the coincidence is from quantum effects. The security logic performs a coincidence assessment using the array (or similar data structure) and the observed coincidences to see whether the outcome is less than 2 for each possible configuration setting. Since there are 16 possible configuration settings, the security logic looks for a coincidence assessment outcome of less than one-eighth (which is 2 divided by 16).

The quantum state used in the protocol is:

$$|\Psi\rangle = \frac{1}{\sqrt{2}}(|\phi_-\rangle|\tilde{\phi}_+\rangle + |\psi_+\rangle|\tilde{\psi}_-\rangle) \quad (3)$$

where $$|\phi_-\rangle = \frac{1}{\sqrt{2}}(|0\rangle|0\rangle - |1\rangle|1\rangle)$$

$$|\psi_+\rangle = \frac{1}{\sqrt{2}}(|0\rangle|1\rangle - |1\rangle|0\rangle)$$

$$|\tilde{\phi}_+\rangle = \frac{1}{\sqrt{2}}(|0\rangle|+\rangle + |1\rangle|-\rangle)$$

$$|\tilde{\psi}_-\rangle = \frac{1}{\sqrt{2}}(|0\rangle|-\rangle - |1\rangle|+\rangle)$$

where, in at least some embodiments, $\{|0\rangle, |1\rangle\}$ is the computational basis (sometimes called standard basis) and, in at least some embodiments, $\{|+\rangle, |-\rangle\}$ is the Hadamard or Fourier basis given by $$|+\rangle = \frac{|0\rangle + |1\rangle}{\sqrt{2}} \text{ and } |-\rangle = \frac{|0\rangle - |1\rangle}{\sqrt{2}}.$$

The quantum state $|\Psi\rangle$ in this example is a uniform linear combination of two quantum states ($|\phi_-\rangle|\phi_+\rangle$ and $|\psi_+\rangle|\psi_-\rangle$) that are maximally entangled states of two qubits. There are several ways of generating the state $|\Psi\rangle$. For example, one possibility is to implement the quantum unitary that maps the product state $|0\rangle|0\rangle|0\rangle|0\rangle$ to $|\Psi\rangle$. To implement this example unitary, one can decompose it into simpler one-qubit and two-qubit unitaries using the Solovay-Kitaev construction.

The input $u_i=0$ corresponds to measurement in the X basis (or Hadamard or Fourier basis), while input $u_i=1$ corresponds to measurements in the Z basis (or computational basis) (for each of the inputs $i \in \{1, 2, 3, 4\}$). To measure in the Z basis, one might, for example, first apply the single qubit unitary that rotates to the Hadamard or Fourier basis and then measure in the computational basis. Under ideal conditions, the implementation of the Bell test above with such an entangled state and quantum measurements gives $B \cdot \{P(x|u)\}=0$.

Figure 4:
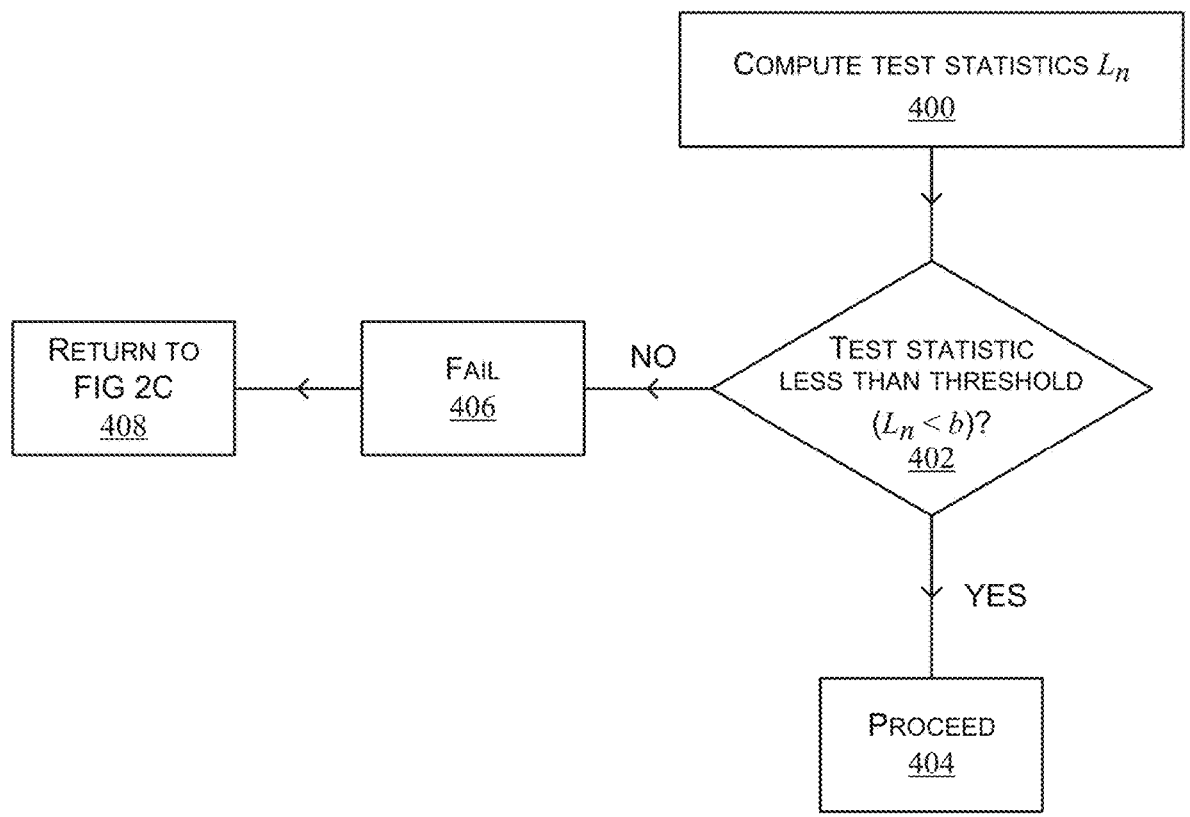
FIG. 4 is a flow diagram of an example security test A in the four-device case.

The security test A for the four-quantum device embodiment is now described formally with reference to FIG. 4.

The string from the weak random source $w_2$ is used to choose the inputs of the measurements in the Bell experiment described above; e.g., for each of the n realizations of the experiment, 4 bits from $w_2$ may be used to choose $(u_i)_j$, with j ranging from 1 to n. Then collect the outputs $(x_i)_j$, which concatenated together form the string $w_3$. A test statistic is computed 400 on the values of the outputs in the string $w_3$. The statistical test includes computing the function:

$$L_n \equiv \frac{1}{n} \sum_{j=1}^{n} B(x_j, u_j), \quad (4)$$

which may be expressed in words as, a test statistic is computed as the reciprocal of the number of measurements, times the sum over the number of measurements of, the appropriate entry from the array of 16 by 16 values (or similar data structure) which is the Bell inequality indicator vector. The appropriate array entries are looked up using the observed measurement values and the settings of the detectors which were used to observe the measurement values.

If the computed value of the test statistic $L_n$ is less than a threshold b (see check 402 in FIG. 4) then the process proceeds 404. Otherwise the process fails 406 and returns to operation 408 of FIG. 2C.

In summary, the process aborts unless $L_n<b$, with b a free parameter that is chosen depending on the quality of the initial weak random source 218; the smaller the delta, the less noise the protocol can tolerate, but on the other hand it can amplify the randomness of weaker sources. For practical realization one might choose, e.g., b=0.01, which gives output random bits which deviate from truly random bits (in variational distance) by at most 0.0001 (which is negligible for most applications). At the same time the value of b=0.01 means that even with the accuracy current achieved in linear optics, ion traps, and superconducting systems (measured in terms of fidelity of around 99.2 percent), it is possible to run the protocol successfully. In another embodiment, b=0.125 and the Bell inequality being tested for is that of equation 1 above. However, other values of the threshold b are used in some cases with the Bell inequality of equation 1 above, or with other Bell inequalities.

Quantum mechanics displays a property known as no-signaling, which means that although entangled states exist which produce nonlocal probability distributions, this non-locality cannot be harnessed in order to provide instantaneous communication between the parties possessing the quantum systems. Many Bell inequalities have the property that there exist other physical theories that lead to a larger Bell violation than quantum mechanics, even though they still obey the no-signaling principle. A famous example of this is the CHSH inequality, which admits a quantum maximum of $2\sqrt{2}$ compared to a classical value of 2; however, no signaling theories that admit an implementation of the Popescu-Rohrlich (PR) box achieve a value of 4. If the correctness of quantum mechanics is not taken as an additional axiom for the present technology, then, seeing a CHSH valuation of $2\sqrt{2}$ cannot be seen as entirely safe, since there is a possibility that the quantum systems have been replaced by a convex mixture of a PR box and a local distribution. In theory, this could lead to 29% of the random bits being known to an adversary. While such attacks are perhaps unlikely, the four-device procedure is secure against them. This is because the Bell inequality used, in some embodiments, has the property that there do not exist any no-signaling theories that admit a larger violation than does quantum mechanics, and so attacks based on alternative physical theories are not viable. This is an example of quantumly accessible maximal nonlocality; it is a quantumly accessible example of logical nonlocality. It is of note that the no signaling principle is guaranteed by Einstein's theory of special and of general relativity. The method used in the four quantum device apparatus is therefore secured by general physical principles, rather than having to rely on the absolute correctness of quantum mechanics.

In the four-quantum device embodiment (and the two-quantum device embodiment) an example of the security test B is formally described as follows:

The security test B includes checking that the 4 different quantum systems are approximately non-signaling among themselves. To explain in a precise way what approximately non-signaling among themselves means, consider the probability distribution of outputs $x_1, \ldots, x_4$ conditioned on the inputs $u_1, \ldots, u_4$:

$p(x_1, x_2, x_3, x_4|u_1, u_2, u_3, u_4)$

The approximate non-signaling condition says that:

$$\sum_{x_2, x_3, x_4} p(x_1, x_2, x_3, x_4|u_1, u_2, u_3, u_4)$$
$$\approx \sum_{x_2, x_3, x_4} p(x_1, x_2, x_3, x_4|u_1, u_2', u_3', u_4')$$

for any pair of measurement devices using measurement settings $u_1, \ldots, u_4$ at a first time and $u_2', u_3', u_4'$ at another time, and likewise for the three other combinations of pairs of measurement devices. That is, the marginal distribution of any measurement device is almost unaffected by the choice of measurements in the other measurement devices (technically it is assumed that the variational distance of all the marginals are the same up to some small error $\varepsilon$, which is a parameter of the test and is taken to be e.g. $\varepsilon=0.02$ in the implementations discussed above). A weak random source is used to generate $(u_i)_j$, which is input into the measurement device to configure the detector settings. The measured output is $(x_i)_j$. Then the apparatus computes the empirical distribution $q(x_1, x_2, x_3, x_4|u_1, u_2, u_3, u_4)$ based on the frequencies obtained. The process aborts unless $$\left\| \sum_{x_2, x_3, x_4} p(x_1, x_2, x_3, x_4|u_1, u_2, u_3, u_4) - \sum_{x_2, x_3, x_4} p(x_1, x_2, x_3, x_4|u_1, u_2', u_3', u_4') \right\|_1 \le \varepsilon, \quad (5)$$

for any $u_1, \ldots, u_4$ and $u_2', u_3', u_4'$, and likewise for the other quantum systems 2, 3, and 4.

Figure 5:
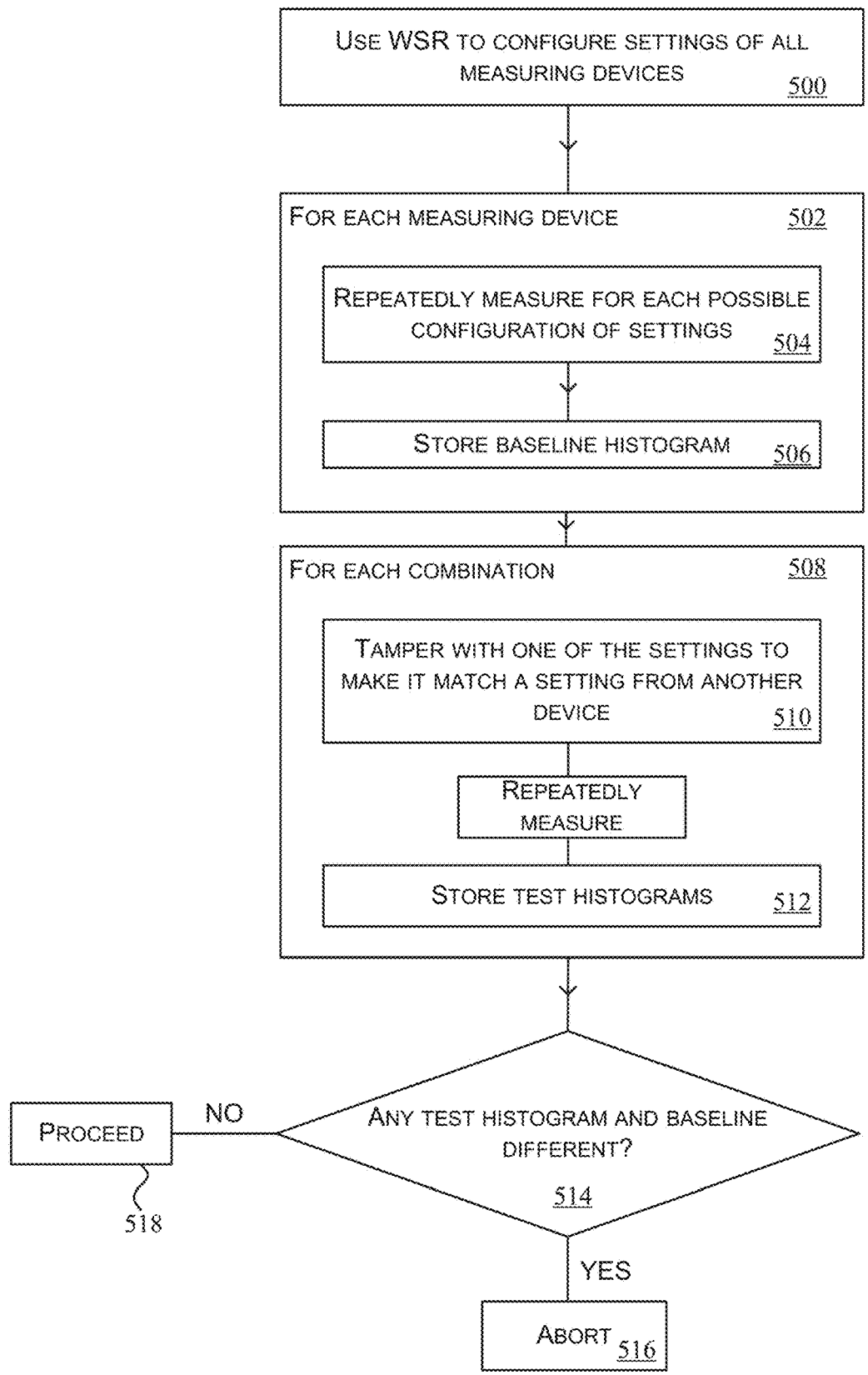
FIG. 5 is a flow diagram of an example security test B.

In summary, with reference to FIG. 5, the security test B comprises using a weak source of randomness 104 such as WSR-1 to configure measurement settings of all the measuring devices of the apparatus (block 500). For 502 each measuring device the security test B process repeatedly measures 504, for each possible configuration of settings of the measurement devices. A baseline histogram is stored 506 for each measuring device showing the frequency of detection of particles for each configuration of measurement settings.

For each combination of measurement settings 508 the process tampers with one of the settings to make it match a setting from another one of the measurement devices. Measurements are repeatedly taken and the results stored 512 in test histograms.

A check is made 514 to see if any test histogram of a measuring device is significantly different from the baseline histogram of that measuring device. If there is a significant difference then an alert or abort step 516 is taken since there is some degree of interaction between the measuring devices which indicates they are not non-signaling. Otherwise, the process proceeds 518 to certify the measuring devices as approximately non-signaling.

Figure 3A:
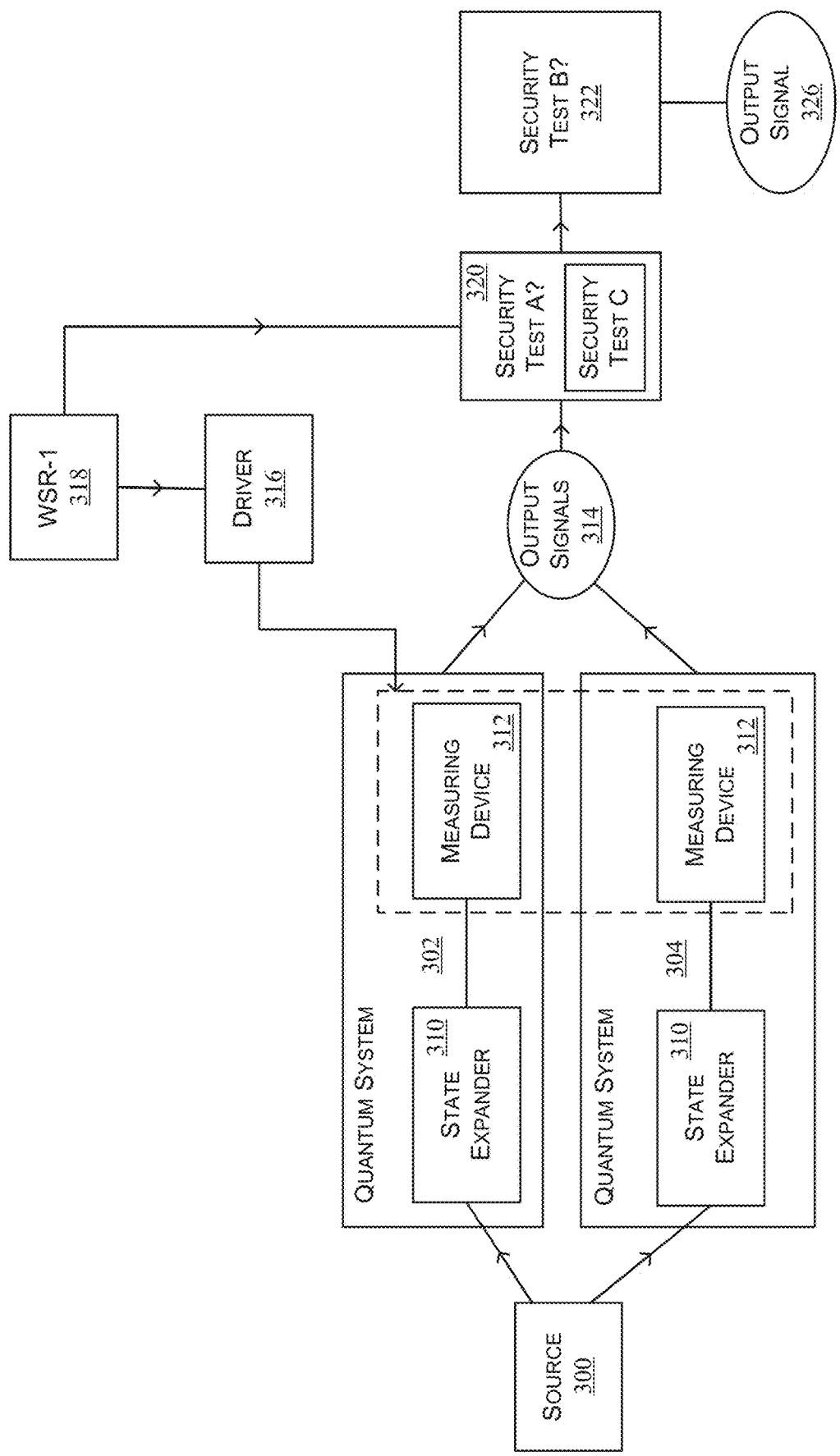
FIG. 3A is a schematic diagram of an example of a two-device quantum apparatus that may be used in the apparatus of FIG. 1.

FIG. 3A shows an example two-device quantum apparatus that is used as the quantum apparatus 102 of FIG. 1 in some embodiments. In the two-device quantum apparatus there are two quantum systems 302, 304 each comprising a state expander 310 and a measuring device 312. A source of qubits is connected to each of the state expanders 310 and generates qubits. The qubits travel into the state expanders 310 and the state of the qubits is prepared into a specified state as the qubits travel through the state expanders 310. The prepared state of the qubits is set out formally below. The measuring devices 312 each contain a plurality of detectors which detect qubits and which are configurable into one or more configurations according to values of settings generated by a weak source of randomness 318. The weak source of randomness 318 generates a random bit string (or other random numbers) and inputs those to driver 316. Driver 316 drives the configuration of the detectors in the measuring devices 312 such as to change a value of a polarization and/or a value of a mode of the detectors.

The prepared qubits travel from the state expanders 310 into the measuring devices 312. Each measuring device has a plurality of possible paths that particles are able to follow. Each path is from a state expander to a detector. The paths are substantially the same length so that the time taken for a qubit to travel along each path is approximately the same. Measurements are taken at each of the detectors at substantially the same time, and output signals 314 result which are, in some examples, in the form of bit strings with one bit per detector and where the bit is 1 to represent a detected particle and 0 to represent no detected particle. The output signals 314 are input to a component 320 which carries out the security test A. The component 320 receives information from the weak source of randomness 318 so that the component 320 knows the configuration settings of the measuring devices 312 which were used to obtain the output signals 314.

In some embodiments, the security test A implemented by component 320 is different from security test A of the four-device quantum apparatus because it implements an additional test denoted security test C.

If security test A is passed then security test B is optionally carried out using component 322. In some embodiments, security test B is the same as described above for the four-device quantum apparatus. The output signal 326 comprises the output signals 314 and information that the security test A (and optionally the security test B) has been passed. Thus downstream systems have information certifying that the output signal 326 was generated by a quantum system and therefore has true randomness.

Figure 3B:
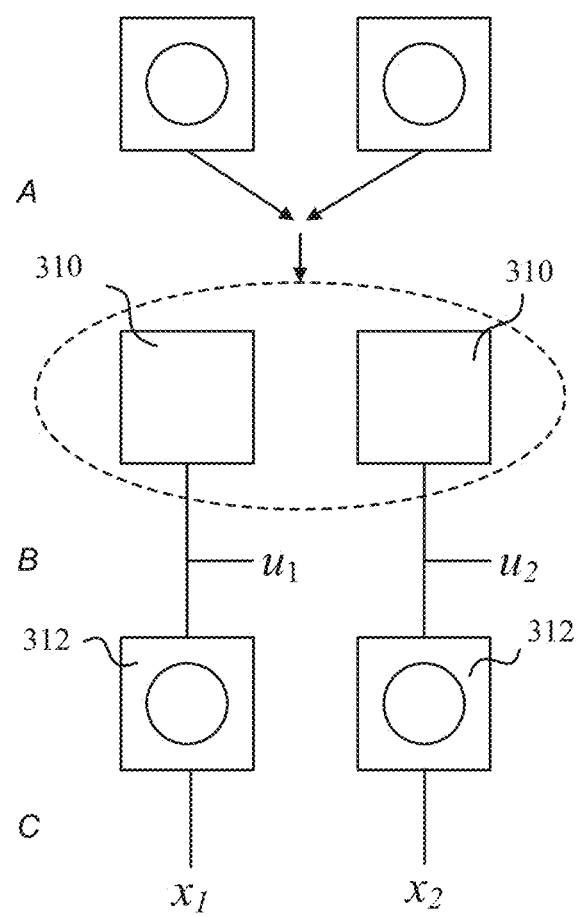
FIG. 3B is another schematic diagram of an example of a two-device quantum apparatus that may be used in the apparatus of FIG. 1.

FIG. 3B is another schematic diagram of the example two-device quantum apparatus for use in the apparatus of FIG. 1. FIG. 3B shows state expanders 310 and measurement devices 312. Qubits (represented by circles inside squares) are input to the state expanders 310 and the state expanders interact so that the qubits become entangled and placed in superposition (the state of the qubits prepared by the state expanders 310 in the two-device apparatus is given below). Detector settings $u_1$ and $u_2$ are input to the measurement devices 312 to set the configuration of detectors in the measurement devices according to the input from the weak source of randomness. The measurement devices measure particles which reach the detectors and output signals $x_1$, $x_2$.

In the case of the example two-device quantum system, the method of operation is very similar to that of the example four-device quantum system described above. However, in at least some embodiments, the state formed in operation A is different and the detector settings are different both in number and definition. Some two-device embodiments will now be further described over the next several paragraphs without repeating at each step phrases such as "in some embodiments."

Figure 3C:
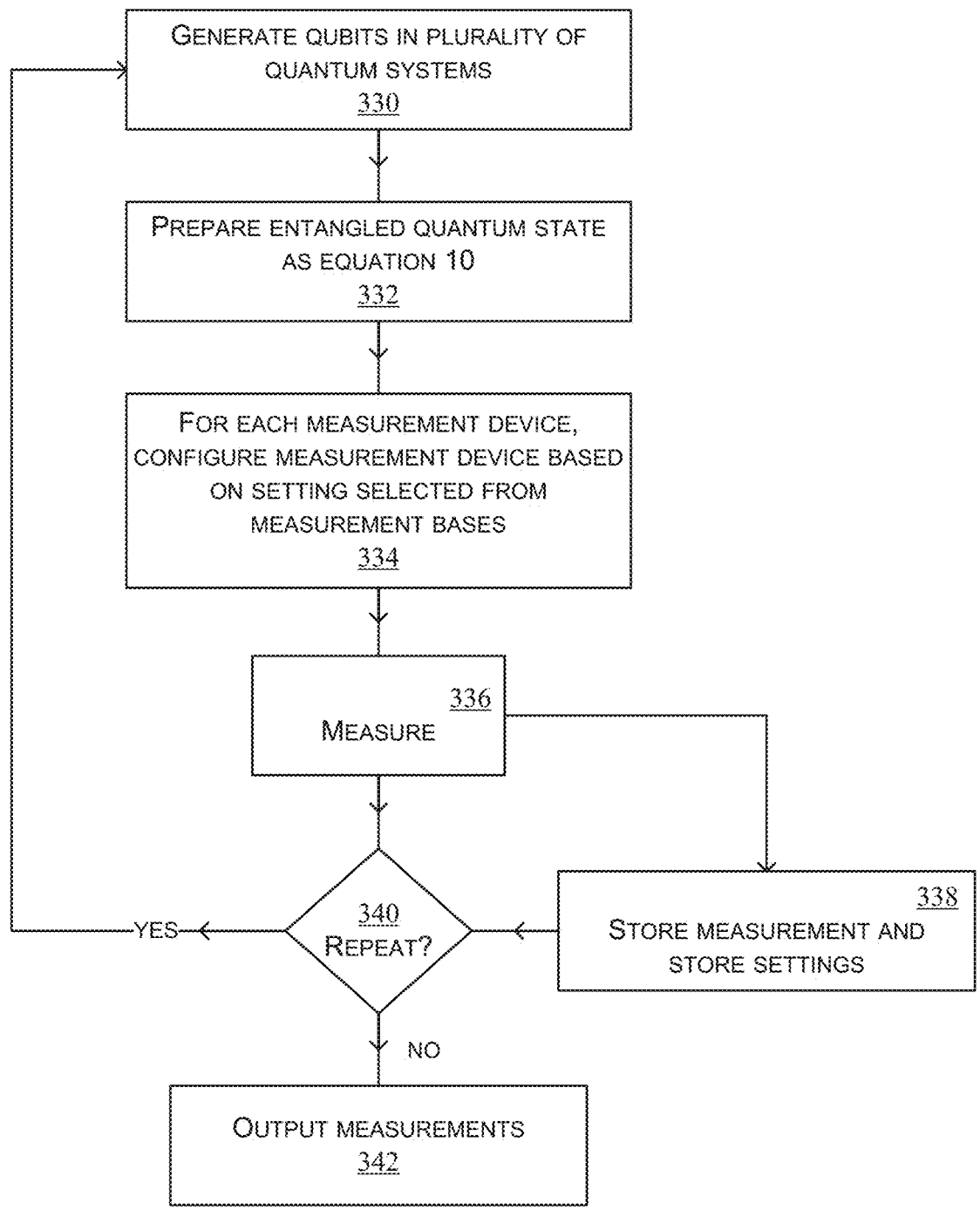
FIG. 3C is a flow diagram of an example method of operation of a two-device quantum apparatus such as shown in FIG. 3A or FIG. 3B.

The two-device quantum apparatus of FIGS. 3A and 3B involves measuring four qubits: two located at each of two physical devices (in contrast to an example four-device quantum apparatus with four physical devices). With reference to FIG. 3C, the procedure at the two-device quantum apparatus is as follows: Qubits are generated 330 in a plurality of quantum systems within two quantum devices 310. The two quantum devices 310 are interacted in order to form an entangled quantum state. The entangled quantum state is prepared 332 as defined in equation 10 below.

The weak source of randomness is used to configure settings independently for each measurement device 312. These settings are derived from the measurement bases available in the method of operation. For example, the weak source of randomness can be used to select a measurement setting from nine measurement bases for each of two measurement devices 312. The measurement settings are used to 334 configure settings of the measurement devices.

Measurements 336 are performed at the two measurement devices and the measurement results are stored 338 together with the values of the measurement bases (the settings). The procedure checks at operation 340 whether to repeat and if so, the process repeats from operation 330. If the check at operation 340 indicates not to repeat the stored measurements and associated settings are output 342. The decision whether to repeat or not at operation 340 is made using criteria such as one or more of: a time interval, a number of repetitions, a number of stored measurements, an amount of available memory for storing the measurements.

The output measurements are checked against a Bell inequality. If the Bell inequality is violated the output measurements are known to be from quantum effects and are input to a randomness extractor as explained with reference to FIG. 1. If the Bell inequality is satisfied, the output measurements are known to be from classical effects and are rejected. Optionally, a further check (security test B) is completed, as explained below.

The Bell inequality to be tested may be expressed as:

$$B \cdot \{P(x|u)\} = \sum_{x,u} B(x, u)P(x|u) \geq 4 \qquad (6)$$

where B is an indicator vector, comprising an indicator function for a set $S_B$. The indicator function is defined as:

$$B(x, u) = \begin{cases} 1 & \text{if } (x, u) \in S_B \\ 0 & \text{otherwise} \end{cases} \qquad (7)$$

which may be expressed in words as, the value of an indicator function B given measurement value x and associated measurement setting value u is equal to 1 if the measurement value and measurement setting value are in the set $S_B$; and otherwise the value of the indicator function is zero.

The set $S_B$ comprises the following set of 18 quantum states, presented here as un-normalised quantum states, which are collected into nine different bases denoted as $M_1$ to $M_9$ below. In this example, each channel is a path that a qubit may follow from the source to a detector and the channels are substantially the same length.

$$|v_1\rangle = |0\rangle \qquad |v_2\rangle = |1\rangle \qquad (8)$$
$$|v_3\rangle = |2\rangle + |3\rangle \qquad |v_4\rangle = |2\rangle - |3\rangle$$
$$|v_5\rangle = |0\rangle - |1\rangle \qquad |v_6\rangle = |0\rangle + |1\rangle - |2\rangle - |3\rangle$$
$$|v_7\rangle = |0\rangle + |1\rangle + |3\rangle + |4\rangle \qquad |v_8\rangle = |0\rangle - |1\rangle + |2\rangle - |3\rangle$$
$$|v_9\rangle = |0\rangle - |2\rangle \qquad |v_{10}\rangle = |1\rangle - |3\rangle$$
$$|v_{11}\rangle = |0\rangle + |2\rangle \qquad |v_{12}\rangle = |0\rangle = |1\rangle - |2\rangle + |3\rangle$$
$$|v_{13}\rangle = -|0\rangle + |1\rangle + |2\rangle + |3\rangle \qquad |v_{14}\rangle = |0\rangle + |1\rangle + |2\rangle - |3\rangle$$
$$|v_{15}\rangle = |0\rangle + |3\rangle \qquad |v_{16}\rangle = |1\rangle - |2\rangle$$
$$|v_{17}\rangle = |1\rangle + |2\rangle \qquad |v_{18}\rangle = |3\rangle$$

$$M_1 = \{|v_1\rangle, |v_2\rangle, |v_3\rangle, |v_4\rangle\} \qquad (9)$$
$$M_2 = \{|v_4\rangle, |v_5\rangle, |v_6\rangle, |v_7\rangle\}$$
$$M_3 = \{|v_7\rangle, |v_8\rangle, |v_9\rangle, |v_{10}\rangle\}$$
$$M_4 = \{|v_{10}\rangle, |v_{11}\rangle, |v_{12}\rangle, |v_{13}\rangle\}$$
$$M_5 = \{|v_{13}\rangle, |v_{14}\rangle, |v_{15}\rangle, |v_{16}\rangle\}$$
$$M_6 = \{|v_{16}\rangle, |v_{17}\rangle, |v_{18}\rangle, |v_1\rangle\}$$
$$M_7 = \{|v_2\rangle, |v_9\rangle, |v_{11}\rangle, |v_{18}\rangle\}$$
$$M_8 = \{|v_3\rangle, |v_5\rangle, |v_{12}\rangle, |v_{14}\rangle\}$$
$$M_9 = \{|v_6\rangle, |v_8\rangle, |v_{15}\rangle, |v_{17}\rangle\}$$

Thus, when a measurement device is configured for measurement base $M_1$ it is able to receive on channels 1, 2, 3, and 4 only. When a measurement device is configured for measurement base $M_2$ it is able to receive on channels 4, 5, 6, and 7 only; and so on for the other measurement bases.

A noncontextual hidden variable assignment to each of the possible measurements would mean an assignment of the values 0 and 1 to each of the vectors such that in each measurement basis there is exactly one vector with a value of 1 assigned to it. There are nine measurement bases, so there are an odd number of 1 assignments overall. However, note that each of the vectors appears in exactly two measurements, and so any assignment of 0 and 1 to the vectors must result in there being an even number of 1s contained within the measurement bases. Hence, such a noncontextual assignment is impossible: this is known as a proof of contextuality. Note that it was not necessary to consider the actual probabilities of getting any measurement outcome, or even their possibilities: this is an example of maximal contextuality which manifests itself in a state-independent fashion.

Both measurement devices 312 have all of the nine measurement bases $M_i$ available to them, and these are selected between at random. There are, then, eighty-one different possibilities for the valuation of u, which denotes the measurement device settings. Define the pair (x, u) to be in $S_B$ if outcome $x_1$ in $u_1$ is orthogonal to the outcome $x_2$ in $u_2$. Choosing the entangled state $$|\Psi\rangle = \frac{1}{2}\sum_{i=0}^{3} |i\rangle \otimes |i\rangle \qquad (10)$$

(which may be expressed in words as one half of the following sum: the tensor product of $|0\rangle$ with itself plus the tensor product of $|1\rangle$ with itself plus the tensor product of $|2\rangle$ with itself plus the tensor product of $|3\rangle$ with itself; $|i\rangle$ may represent a qubit on channel i) results in each of these measurement outcomes in the set $S_B$ being impossible, yielding a left-hand side of 0 for the Bell inequality (e.g., equation 6 above). Therefore there is a maximal amount of nonlocality with respect to the set of non-signaling physical devices.

Figure 6:
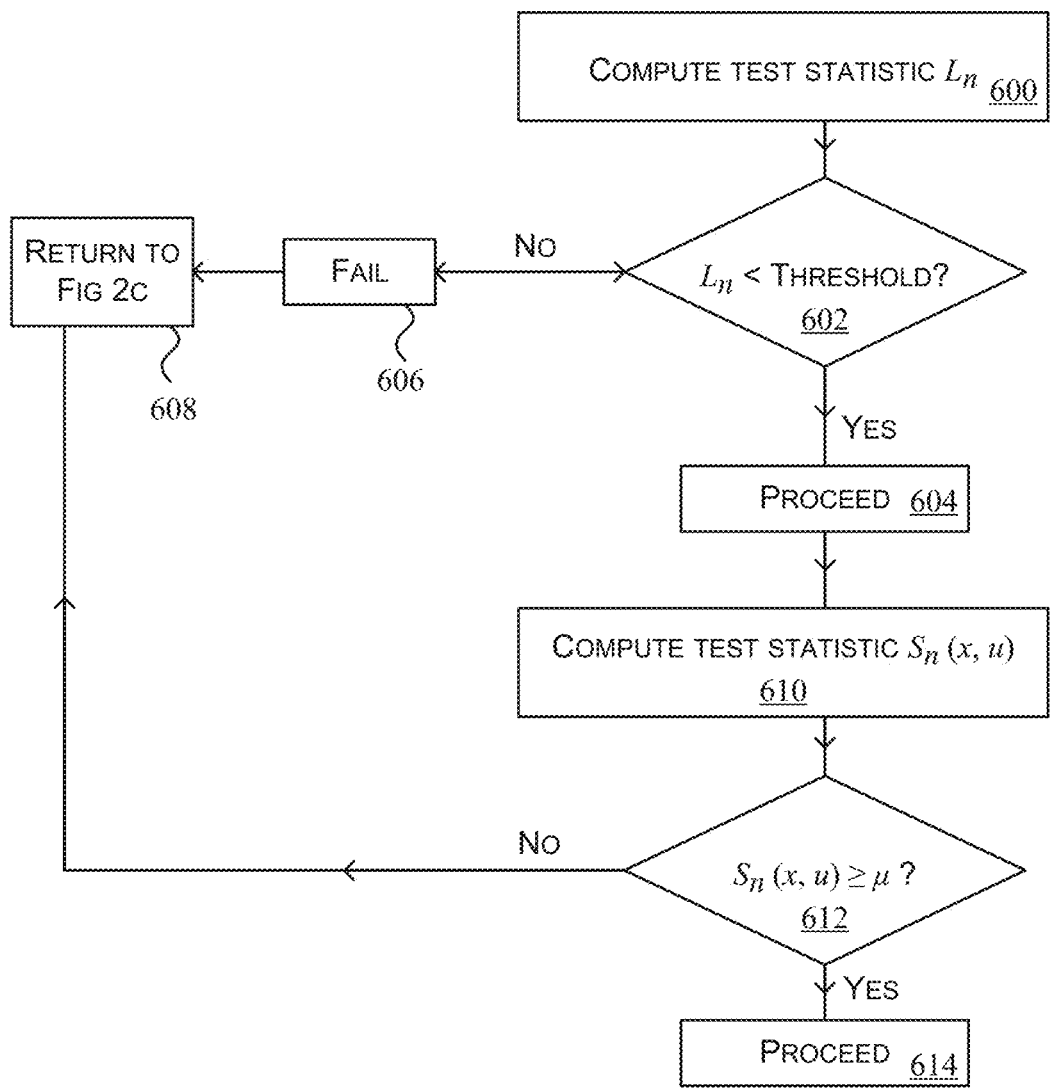
FIG. 6 is a flow diagram of an example security test A in the two-device case.

The security tests for the two-device quantum apparatus embodiments are now described with reference to FIG. 6. Security test A is completed by computing test statistic $L_n$ at operation 600. Security test A is the same as described above with reference to the four-device quantum apparatus embodiments. If the test statistic $L_n$ is lower than the threshold at check 602 the process proceeds to security test C whereby test statistic $S_n(x, u)$ is computed 610. Using mathematical notation to describe security test A, the apparatus computes a test statistic defined by:

$$L_n \equiv \frac{1}{n}\sum_{j=1}^{n} B(x_j, u_j), \qquad (11)$$

The apparatus aborts (see fail box 606 of FIG. 6) the process unless $L_n < b$, where b is a free parameter chosen with regard to the quality of the initial weak random source 318. In an example b=0.125.

If the test statistic $L_n$ is less than the threshold b, the process proceeds to carry out an additional security test, referred to as security test C. Security test C comprises defining, for any fixed measurement setting u*, the random variable $D(x_j, u_j)$ to be:

$$D_j^u(x) = D(x_j, u_j) = \begin{cases} 1 & \text{if}(x_j = x^* \wedge u_j = u^*) \\ 0 & \text{otherwise} \end{cases} \qquad (12)$$

where x* is a measurement result and u* is a prior-chosen measurement setting. Expressed in words, the random variable D, for an observed measurement and the corresponding detector setting, is equal to 1 if the observed measurement is equal to a specified measurement result and the measurement setting is the fixed measurement setting; otherwise D is zero. The values of the random variable D may be looked up from an array of zeros and ones where the array has one column for each combination of measurement settings and one row for each measurement value combination. The array is populated using the same principles as for the array described earlier in this document for the four quantum system apparatus embodiment. As before, other data structures such as hash tables may be used as well.

A test statistic for security test C is defined as:

$$S_n(x, u) = \frac{1}{n}\sum_{j=1}^{n} D(x_j, u_j)$$

which may be expressed in words as a test statistic for security test C is equal to the reciprocal of the number of measurements taken, multiplied by the sum, over the number of measurements taken, of the value of the random variable D corresponding to the observed measurement value and the corresponding value of the measurement setting. In some embodiments, the value of the random variable D is looked up in an array or other data structure providing a look-up mechanism, as described above.

A parameter μ is fixed at a value greater than zero (μ>0), and a check 612 is made whether the test statistic for security test C is greater than or equal to the value of parameter μ, which is expressed mathematically as $S_n(x, u) \geq \mu$. When the test accepts (e.g., the test statistic for security test C is greater than the value of parameter μ), this acts as a guarantee that the measurement devices 312 are correctly producing randomness for the input setting u* and the process proceeds 614. If, however, the test is not passed (e.g., the test statistic for security test C is less than the value of parameter μ), the process is aborted and returns to operation 230 of FIG. 2C as indicated at box 608 of FIG. 6.

In summary, the security tests A and C, in the two-device embodiments, act as a test for a Bell inequality. If these tests are passed the measurement result from the detectors is certified as being generated from qubits and not from classical particles.

In another embodiment, the quantum apparatus 102 of FIG. 1 comprises a quantum system of only two qubits with four modes of freedom and has measurement devices which take only two different quantum measurements for each quantum system. In this case the security test A can implement a CHSH test. A CHSH inequality is useable in a proof of Bell's theorem.

More detail about the randomness extractor 110 of FIG. 1 is now given. In general, a randomness extractor 110 is a deterministic function that takes as input one or more strings of random bits and produces as its output signal 116 a completely random sequence of bits. The one or more input strings of random bits may be a string or strings of weakly random bits (for example, a string of weakly random bits may have a bias towards 0 rather than being uniformly random). A noncertifiable nondeterministic random number is an example of a weakly random number. In general, randomness extraction is impossible unless there are two or more sources, which, while they may not be perfectly random in their own right, are independent from each other. Classically, this is impossible to achieve in a device-independent way; however, the present technology certifies that the output string 108 given by the measurement results is independent from the weakly random number 112 (provided by WSR-2, a weak source of randomness 114) that is also sent to the randomness extractor 110. The assumption that WSR-2 can be thought of as a Santha-Vazirani source is enough to prove that the measurement outcomes 108 from the quantum apparatus 102 are completely independent of the weakly random number 112 that is sent directly from WSR-2 to the classical randomness extractor 110. The presence of quantum noise does not weaken this fact to an extent that it ceases to be applicable: even when accounting for noise the measurement results form a random source of very low min-entropy.

This means that the randomness extractor 110 only has to operate in a classical setting for which there exist known ways of extracting a truly random string. The guarantee of independence of the two inputs 108, 112 to the randomness extractor 110, while impossible to guarantee classically, has been made possible by harnessing the nonlocal measurement properties of the entangled quantum system in quantum apparatus 102. There are many such classical randomness extractors 110 including but not limited to: Von Neumann extractors, chaos machines, cryptographic hash functions. An example is the randomness extractor of Li ("Improved constructions of two-source extractors" Xin Li, 5 Aug. 2015 arXiv:1508.01115), which gives a practical choice for the protocol. Other example randomness extractors which are suitable include the implementations of Trevisian's randomness extractor and/or the Toeplitz-hashing extractor as described in Ma, et al "Postprocessing for quantum random-number generators: entropy evaluation and randomness extraction" arXiv:1207.1473v2 22 Jun. 2013.

Figure 7:
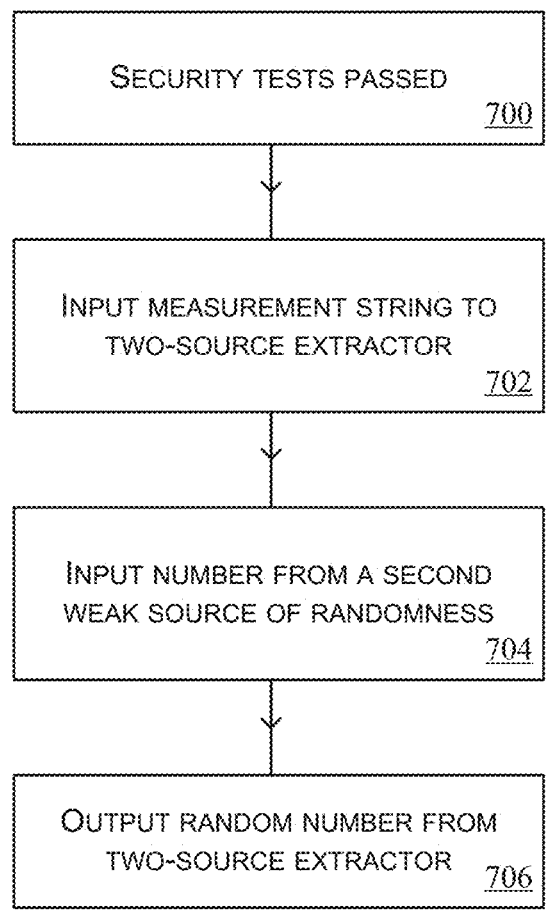
FIG. 7 is a flow diagram of an example method of operation of a randomness extractor such as in the arrangement of FIG. 1.

FIG. 7 is a flow diagram of an example method of operation of a randomness extractor 110 such as in the arrangement of FIG. 1. At 700, if the measurements performed by the quantum apparatus pass the security tests, then a measurement string output by the quantum apparatus is certifiably produced by quantum effects. The measurement string can comprise the output string 108 described with reference to FIG. 1. As described herein, the security tests can include one or more of security test A, optional security test B, or security test C (e.g., for a two-device quantum apparatus). See, for example, the description of the security tests with reference to FIGS. 2A and 3A. At 702, the measurement string is passed to a two-source extractor. At 704, the two-source extractor receives an input from a second weak source of randomness (e.g., WSR-2 114). Because the security tests were passed at 700, it is certifiably known that the measurement string and the second weak source of randomness are independent. The two-source extractor combines these inputs, and at 706 outputs a random number. The random number can comprise a completely and certifiably random sequence of bits as described with reference to the output signal 116 of FIG. 1, the output signal 226 of FIG. 2A, or the output signal 326 of FIG. 3A.

The technology has been described so far in this document using general language, explaining the technology in terms of qubits, measurements, channels, quantum states and so forth. This is to highlight that the technology is implementable in a variety of different physical platforms. Three particular platforms which are suitable for implementing the technology are now given. The following three platforms are intended to illustrate, and not to limit, example implementations of the technology.

Optics:

In optical systems for quantum information processing, the unit of light in a given mode, referred to as a photon, is used to represent a qubit. Operations via optical elements (beam splitters, mirrors and phase shifters) are used to implement quantum gates on the qubits. To prepare a state of many photonic qubits, the well-established procedure of optical parametric down-conversion is used. In optical parametric down-conversion, a beam of light is sent through a non-linear crystal, which then outputs twin photons whose polarization (or momentum) are entangled. Another approach is to generate single photons in a well-defined quantum state. Again this can be done using optical elements. Another element that can be used for implementing a general quantum circuit are quantum gates (transformations of the quantum state of one or more photons). The basic principle is that using beam splitters and/or phase shifters one can construct any arbitrary 1-qubit unitary operation. For two-qubit gates, it is possible to use an optical device (e.g., with a Kerr non-linearity) or use measurements to simulate the non-linearity, as in the Kerr non-linearity scheme. Measurements of the photons may be performed with industrial-made photodetectors comprising a p-n junction that converts light photons into current.

In an example using optics, four individual photons are created, by producing four pairs with parametric downconversion, and detecting one photon from each pair in order to herald the other. Then, the photons are made to interact using the scheme of Knill, Laflamme and Milburn "A scheme for efficient quantum computation with linear optics" Nature, 409(6816): 46-52. Alternatively the photons are made to interact via a nonlinear optical medium with a very large third-order nonlinear susceptibility $\chi^{(3)}$ value as described in Pritchard, Weatherill and Adams, "Non-linear optics using cold Rydberg atoms," in Annual review of cold atoms and molecules, 1 (301), 2013. This is repeated, if necessary, until the outcome of the interaction is the desired state. Each of the four measurement devices receives an input bit $u_i$, $i \in \{1, 2, 3, 4\}$, which selects a specific measurement setting. When each detector has received its input signal, it either adds a half-wave plate to the path of the incoming photon, or does nothing. Then, measurement takes place using an avalanche photodiode, and the outcome (having seen a photon, or having not) is output as the measurement result, $x_i$. These steps are repeated in the next rounds.

Ion Traps:

The set-up may be a linear array of trapped atoms (e.g., by standing electromagnetic waves). Each ion stores one qubit in two ground state hyperfine levels. Hyperfine qubits are extremely long-lived (e.g., decay time of the order of thousands to millions of years) and stable in phase and frequency (being thus traditionally used for atomic frequency standards). Ionic qubit states are prepared in a specific qubit state using the well-known process of optical pumping.

Measurements can be done as follows. A laser is applied to the ion that couples only one of the qubit states. When the ion collapses into this state during the measurement process, the laser will excite it, resulting in a photon being released when the ion decays from the excited state. After decay, the ion is continually excited by the laser and repeatedly emits photons. These photons can be collected by a photomultiplier tube (PMT) or a charge-coupled device (CCD) camera. If the ion collapses into the other qubit state, then it does not interact with the laser and no photon is emitted. By counting the number of collected photons, the state of the ion may be determined with a very high accuracy (e.g., greater than about 99.9 percent).

Quantum gates can be implemented as follows. Single qubit gates can be implemented using magnetic dipole transitions or stimulated Raman transitions for hyperfine qubits and electric quadrupole transitions for optical qubits. Two qubit gates can be implemented by coupling the electronic state of the ions to the collective mol. Using the scheme of Cirac-Zoller, four entangled ions can be generated. The Cirac-Zoller scheme is set out in Cirac, J. I.; Zoller, P. (1995 May 15). "Quantum Computations with Cold Trapped Ions". Physical Review Letters. 74 (20): 4091-4094.

In an example using ion traps, four entangled ions are generated, each of the four measurement devices of the quantum apparatus of FIG. 2A receives an input bit $u_i$, $i \in \{1, 2, 3, 4\}$ which selects a specific measurement setting. To measure each of the four qubits stored in the ions the apparatus either detects it using a CCD camera (if $u_i=0$ and one wishes to measure in the computational basis) or first the apparatus applies a laser to rotate the qubit to the Fourier basis and then measures the ion with the CCD camera (in case $u_i=1$). The detector then outputs a bit that contains the result of the measurement, $x_i$. These steps are repeated in the next rounds.

Superconducting Circuits:

The randomness generation protocol can also be implemented in superconducting circuits.

Example of Quantum Apparatus Using Optical Systems

A detailed embodiment is now described with reference to FIGS. 8 to 12 in which the quantum apparatus 102 is implemented using optical systems. The following detailed description is intended to illustrate the embodiment described with reference to FIGS. 8 to 12 but not to limit the scope or the design of the apparatus.

A conventional laser can be used to produce photons, some of which are classical and some of which are entangled quantum photons. The photons from the laser are input to one or two pairs of parametric downconversion waveguides so that the entangled quantum photons have more than one path to follow in the waveguides and so that the quantum photons interact. The parametric downconversion waveguides make at least some of the photons interact because the scheme of Knill, Laflamme and Milburn "A scheme for efficient quantum computation with linear optics" Nature, 409(6816): 46-52 is used in this embodiment. As a result, the output from the waveguides comprises a stream of photons, some of which are classical photons and some of which are entangled and interacting in quantum states according to the Knill Laflamme Milburn scheme.

The stream of photons enters a plurality of measurement devices. Each measurement device has multiple possible paths that a photon may follow, each path ending in an avalanche photodiode or other photon detector. The paths are the same length. Thus a quantum photon in superposition will travel along all paths available to it and reach each of the photon detectors at the end of those paths at the same time. By looking for coincidences at the detectors (where multiple detectors detect a photon at the same time) it is possible to find evidence of quantum photons in superposition. Classical photons are also able to travel down the paths in the measurement devices but are not in superposition. Therefore by looking at the patterns of outputs at the detectors evidence of classical photons is also found. Measurement settings of the detectors are changed in order to increase security and avoid any risk of malicious parties knowing the measurement settings and tampering with the results. Many millions of measurements may be taken in some implementations, and evidence for and against the presence of quantum photons can be aggregated before making a decision as to whether the outputs of the measurement devices are from a quantum system or not.

Figure 8:
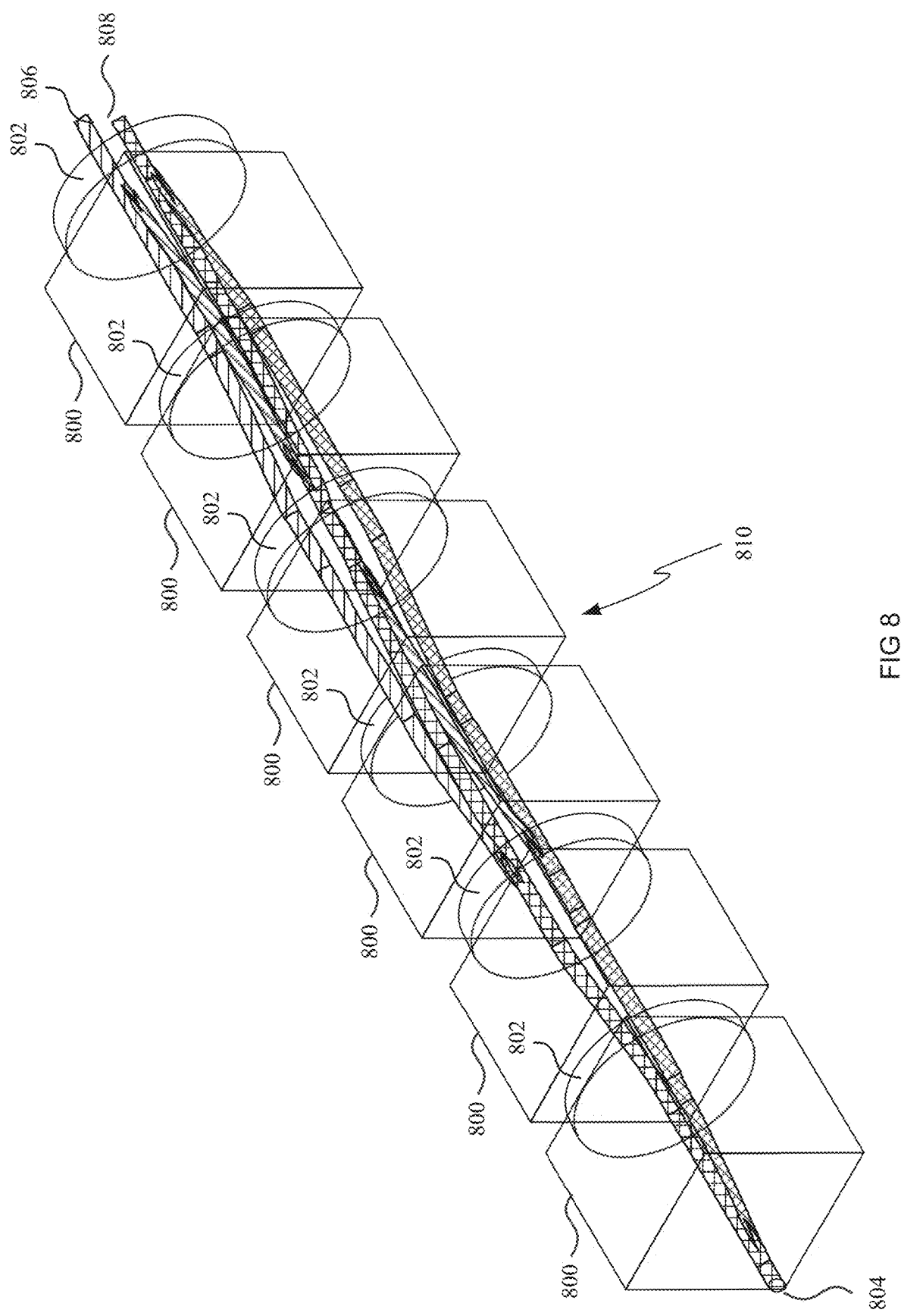
FIG. 8 is a perspective view of an example of a waveguide of an optical state expander.

In this example, the state expander 210 of FIG. 2A has two optical waveguides 810, and FIG. 8 is a perspective view of one such optical waveguide. The waveguide 810 is suitable for use in other types of quantum apparatus as well as that of FIG. 2A.

The state expander 210, in the optical case, can exploit the quantum superposition of an entangled photon. The state expander 210 can have at least one pair of waveguides, each waveguide 810 comprising a plurality of blocks 800 of light displacing material interspersed with a plurality of polarization modifiers 802. The waveguide 810 has an input 804 to receive a pair of entangled photons from a source, such as a laser. The photons are transmitted through the waveguide and deflected by the blocks 800 and polarized by the polarization modifiers 802. There are two outputs 806, 808 of the waveguide, one for each of two mutually orthogonal polarizations.

Each member of the pair of entangled photons has a polarization which is mutually orthogonal with respect to the other member of the pair. The input 804 is connected to the pair of waveguides (although only one waveguide is shown in FIG. 8) such that each waveguide receives one of the pair of entangled photons and guides the entangled photon within the waveguide through the blocks 800 of light displacing material and the polarization modifiers 802 to create a quantum superposition of the photon whereby there are a plurality of possible paths the photon follows within the waveguide along which polarization is changed. The plurality of possible paths are shown in more detail in FIG. 10.

Each waveguide 810 is sized and shaped such that, for each entangled photon a length of a path travelled by the photon through the waveguide is substantially the same irrespective of the mutually orthogonal polarizations of the entangled photons.

Each waveguide 810 has a pair of output optical fibres 806, 808, each output optical fibre 806, 808 of a pair being configured to accept light which is polarized in one of the mutually orthogonal polarizations and to discard light which is polarized in the other mutually orthogonal polarization.

Figure 9:
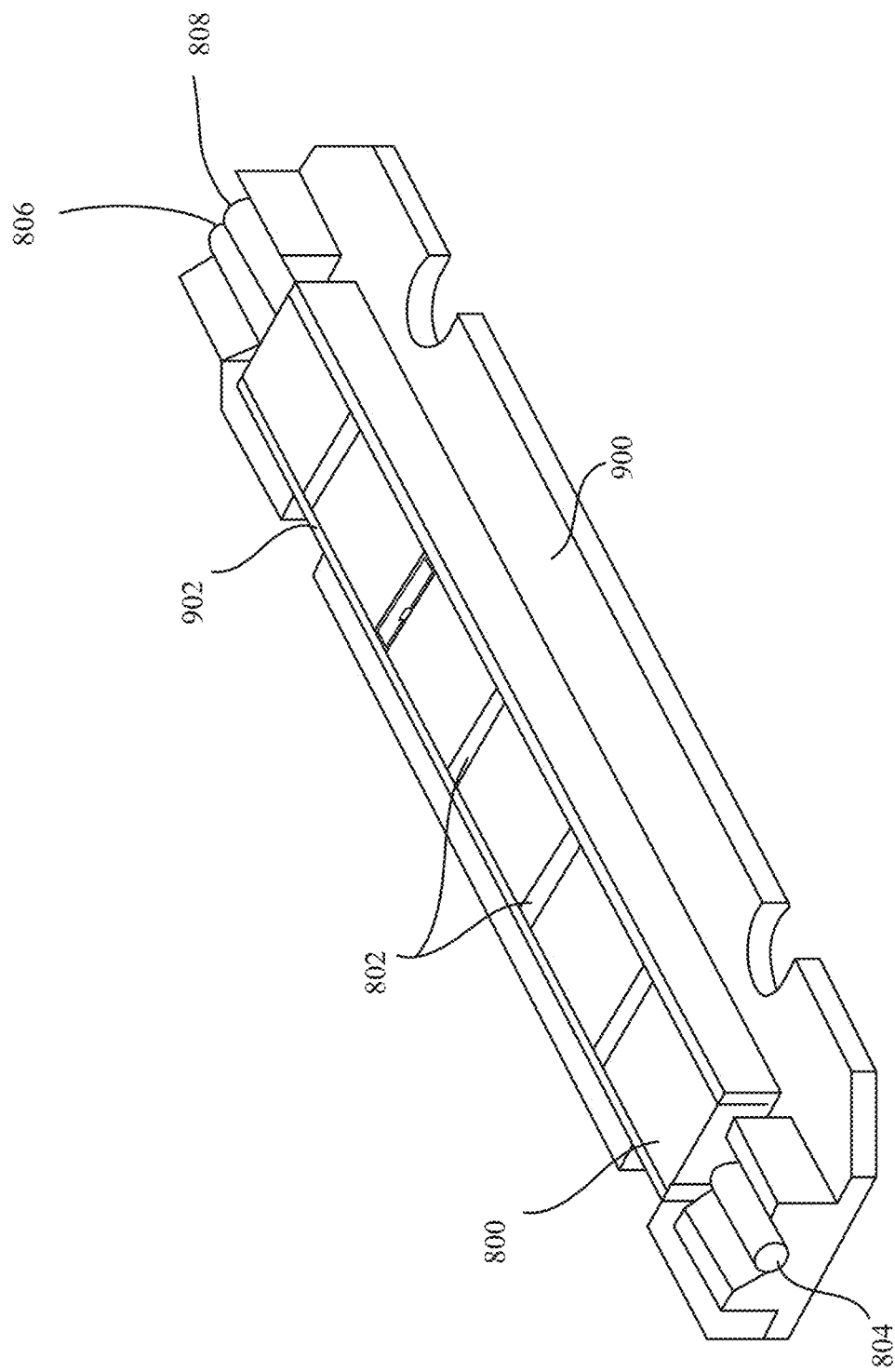
FIG. 9 is a perspective view of the waveguide of FIG. 8 installed in a housing and with a cover omitted.

FIG. 9 shows the waveguide 810 in a housing (also referred to as a casing) 900 which has a longitudinal channel 902 sized and shaped to hold the waveguide such that the blocks 800 of light displacing material fit against the sides of the channel 902. The housing 900 has a removable cover which closes over the channel 902 once the waveguide is inside the channel. The housing 900 and cover act to protect the waveguide from environmental conditions such as humidity, dust, motion, temperature changes and other environmental changes. The casing can be formed from material which reduces the influence of atmospheric pressure, vibration, humidity on the waveguide.

Figure 10:
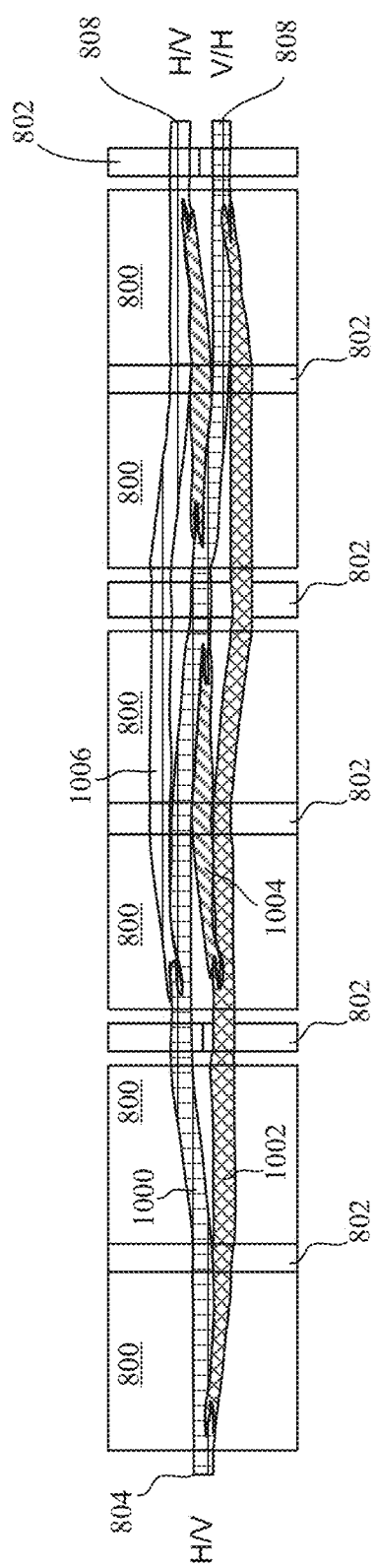
FIG. 10 is a schematic longitudinal cross-section through the waveguide of FIG. 8.

FIG. 10 is a schematic longitudinal cross section through the waveguide 810 of FIG. 8. In this example there are six blocks 800 of light displacing material although other numbers of blocks are used in other examples. In this example there are six polarization modifiers 802 although other numbers of polarization modifiers are used in other examples. In this example there is one polarization modifier at the output end of the waveguide 802 and the other five polarization modifiers are each between two different ones of the blocks 800. Horizontally polarized photons (denoted by H) entering the waveguide are deflected so as to have two possible paths 1000, 1006 through the waveguide. Vertically polarized photons (denoted by V) entering the waveguide are deflected so as to have two possible paths 1002, 1004 through the waveguide. Note that the plurality of paths through the waveguide are substantially the same length since all the paths pass through the waveguide which is of a fixed length.

Figure 11A:
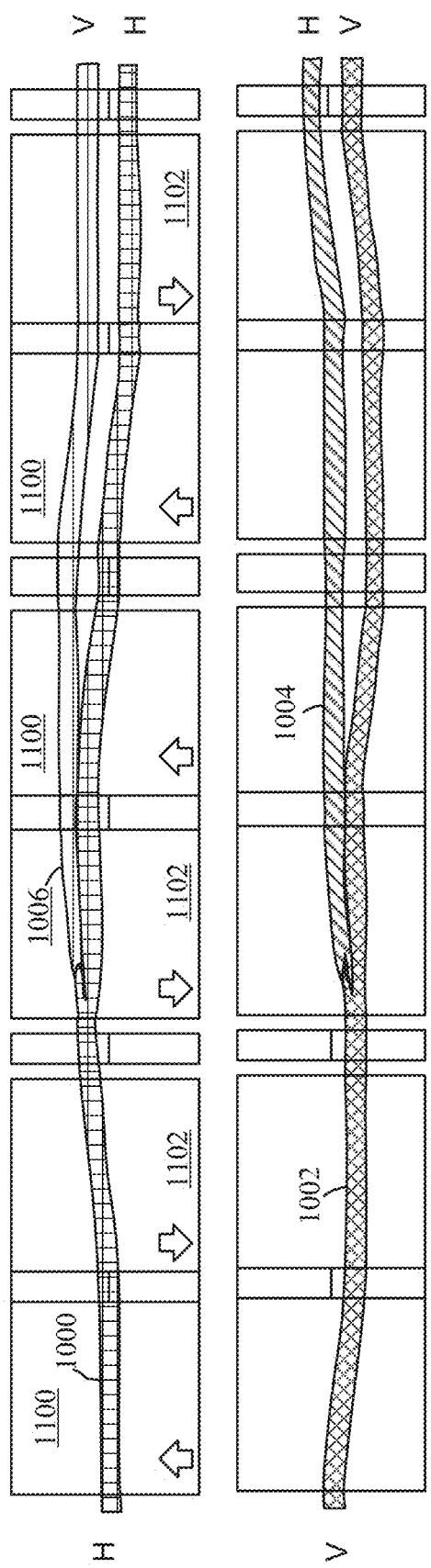
FIG. 11A is a schematic diagram to explain operation of the waveguide of FIG. 8.
Figure 11B:
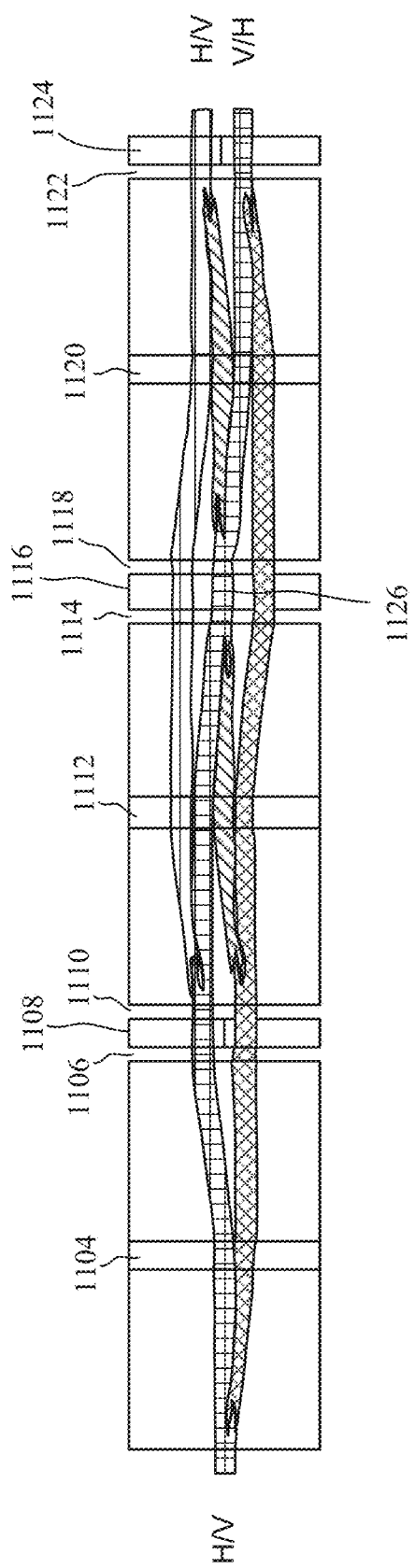
FIG. 11B is the same as FIG. 8 but with reference numerals to indicate air gaps.

As shown in FIG. 11A the of blocks 800 of light displacing material comprise at least one block 1100 formed of a material which displaces light in a first direction (as indicated by the up arrow in blocks 1100 of FIG. 11A), and at least one block 1102 formed from material which displaces light in a second direction different from the first direction (as indicated by the down arrow in blocks 1102 of FIG. 11A). FIG. 11A shows the waveguide as duplicated in order to aid understanding of the technology. The upper one of the waveguides in FIG. 11A shows a horizontally polarized photon entering the waveguide on path 1000 and being deflected/displaced by the blocks such that the photon, where it is an entangled photon output from the laser, is able to follow two possible paths 1000 and 1006 through the waveguide simultaneously. The lower one of the waveguides in FIG. 11B shows the same situation for a vertically polarized photon entering the waveguide. Note that in reality the upper and lower waveguides of FIG. 11B are the same waveguide and the paths 1000, 1002, 1004, 1006 pass through a single waveguide as indicated in FIG. 10.

At least one block 1100 which displaces light in a first direction is made from an up-air crystal, and the at least one block 1102 which displaces light in the second direction is made from a down-air crystal. In this way displacement of the photons is facilitated which leads to creation of multiple possible paths for entangled photons from the laser to follow. An up-air crystal displaces light in a first direction away from a longitudinal axis of the waveguide. A down-air crystal displaces light in a second direction away from the longitudinal axis of the waveguide and substantially opposite to the first direction.

Preferably the plurality of blocks 800 of light displacing material are made of the same material since this facilitates manufacture. However, using the same material is not essential. A non-exhaustive list of examples of materials the blocks 800 are made from is one or more of: calcite or lithium niobate. In a preferred example the waveguide 810 comprises six blocks of light displacing material, as this gives a practical working solution that is relatively easy to manufacture. However, other numbers of blocks 800 are used in other examples.

In FIG. 11A the waveguide 810 is shown with six blocks of light displacing material made from up-air crystal and down-air crystal arranged in the following sequence from an output end of the waveguide to an input end of the waveguide: down-air crystal, up-air crystal, up-air crystal, down-air crystal, down-air crystal, up-air crystal. This arrangement is found to be particularly effective for providing multiple optical paths for qubits with quantum state suitable for the embodiments of FIG. 2A, and/or as defined in equation 3 above.

In the example of FIGS. 11A and 11B the polarization modifiers are placed in the sequence of blocks of light displacing material in the following order from an output end of the waveguide to an input end of the waveguide and with or without the following air gaps: polarization modifier 1124, air gap 1122, down-air crystal, polarization modifier 1120, up-air crystal, air gap 1118, polarization modifier 1116, air gap 1114, up-air crystal, polarization modifier 1112, down-air crystal, air gap 1110, polarization modifier 1108, air gap 1106, down-air crystal, polarization modifier 1104, up-air crystal.

The polarization modifiers can be half wave plates some of which are separated from adjacent ones of the blocks of light displacing material by air gaps. Others of the polarization modifiers may be in contact with adjacent ones of the blocks of light displacing material. By selecting the location or size of the air gaps the ability of the ability of the photons to diffract or be displaced within the waveguide is facilitated.

At least one of the polarization modifiers comprises a region 1126 through which light passes without modification of polarization. The region is configured such that light is transmitted with no polarization change. In the example of FIG. 11B the region 1126 is in the third polarization modifier 1116 from the output end of the waveguide.

In some examples there is a cooling chamber holding the waveguides and configured to reduce the temperature of the waveguides to around minus twenty degrees Celsius during operation, since this reduces noise in the generated qubits (that is the waveguide 810 generates a higher proportion of qubits in the desired state as opposed to classical photons).

The state expander, in the optical embodiment just described, receives from a generator such as a laser, a pair of entangled photons each member of the pair having a polarization which is mutually orthogonal with respect to the other member of the pair. The state expander inputs the entangled photons to a pair of waveguides, such that each waveguide 810 receives one of the pair of entangled photons and guides the entangled photon within the waveguide along its length to create a quantum superposition of the photon whereby there are a plurality of possible paths the photon follows within the waveguide along which polarization is changed. Each waveguide is sized and shaped such that, for each entangled photon a length of a path travelled by the photon through the waveguide is substantially the same irrespective of the mutually orthogonal polarizations of the entangled photons.

Figure 12:
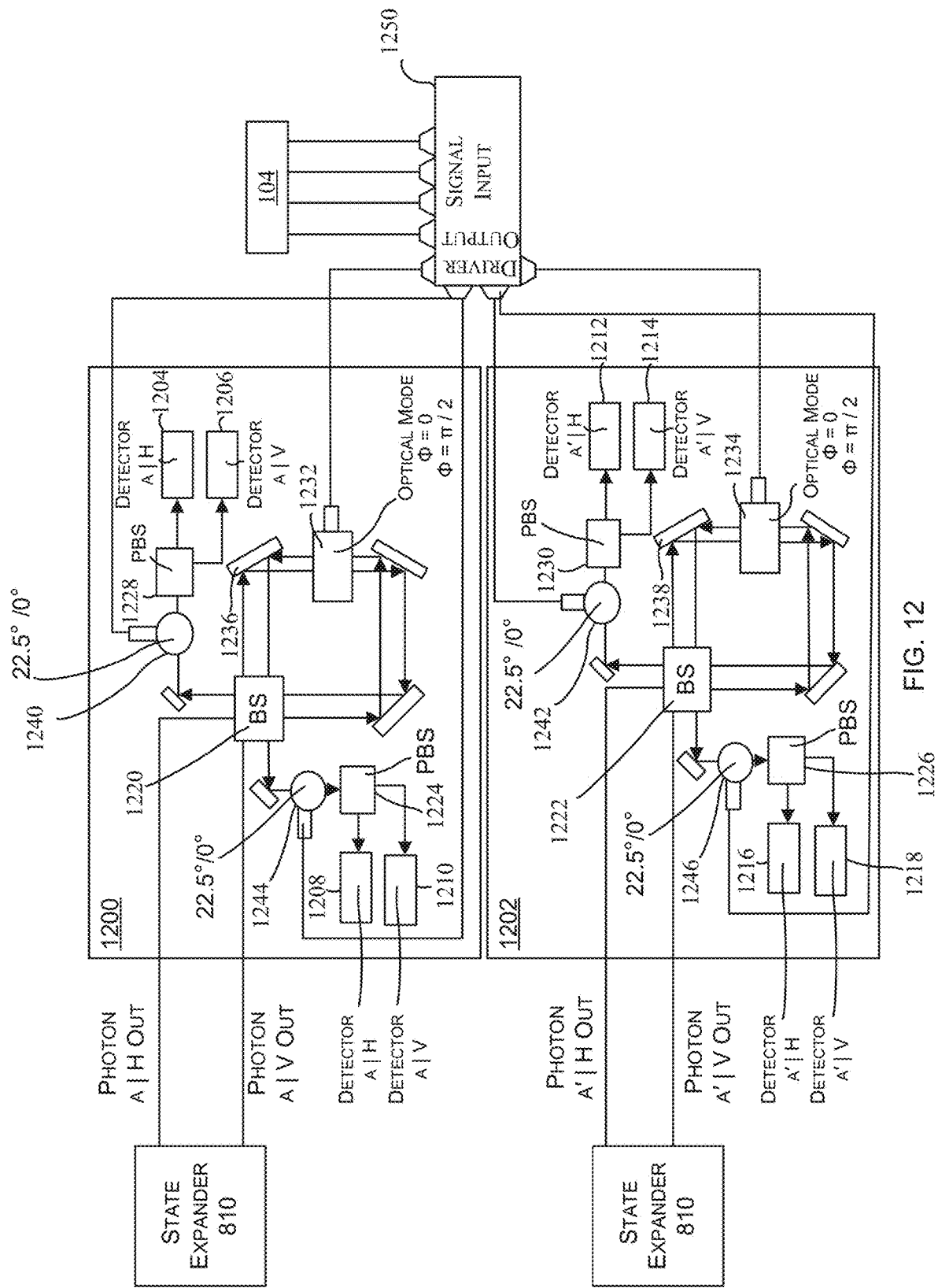
FIG. 12 is a schematic diagram of an example pair of measuring devices that may be used in the apparatus of FIG. 2A.

FIG. 12 is a schematic diagram of an example of a pair of measuring devices 1200 and 1202 for measuring particles received from state expanders 810. In this example the measuring devices 1200 and 1202 are optical and the qubits are formed using photons as described with reference to FIGS. 8 to 11B. Note that FIG. 12 shows only one pair of measuring devices 1200 and 1202 although in practice, in the apparatus of FIG. 2A there can be four such measuring devices. Having said that, in the example of FIG. 3A there are only two such measuring devices.

Each measuring device 1200, 1202 has multiple possible paths that a photon may follow, each path ending in an avalanche photodiode or other photon detector. The paths are substantially the same length. Thus a quantum photon in superposition will travel along all paths available to it and reach each of the photon detectors at the end of those paths at substantially the same time. By looking for patterns of coincidences at the detectors (where multiple detectors detect a photon at the same time) it is possible to find evidence of quantum photons in superposition which gives evidence of violation of a Bell inequality. Classical photons are also able to travel down the paths in the measuring devices but are not in superposition and give different patterns at the detectors than do quantum photons. Measurement settings of the detectors can be changed in order to increase security. Many millions of measurements may be taken and evidence for and against the presence of quantum photons can be aggregated to decide whether a Bell inequality is violated or not.

The pair of measuring devices 1200 and 1202 in FIG. 12 are part of an apparatus for detecting entangled photon pairs which are in superposition in a stream of photons comprising both entangled photon pairs and classical photons. Each measuring device 1200, 1202 has a plurality of detectors (1204, 1206, 1208, and 1210 for measuring device 1200 and 1212, 1214, 1216, and 1218 for measuring device 1202), each detector arranged to detect single photons. Each measuring device 1200, 1202 has detector configuration apparatus, to automatically configure, according to values of control parameters, for each detector, a measurement basis of the detector. In the example of FIG. 12 the detector configuration apparatus in measuring device 1200 comprises polarization modifiers 1240, 1244 and optical mode setter 1232. The detector configuration apparatus in measuring device 1202 comprises polarization modifiers 1242, 1246 and optical mode setter 1234.

Each measuring device 1200, 1202 has a photon input from a corresponding state expander 810. Each photon input has two photon paths: one for each of two possible mutually orthogonal photon polarizations (e.g., horizontal (H) and vertical (V)), each photon path travelling to a different one of the detectors and wherein the photon paths within a single measuring device are substantially the same length. In FIG. 12, the photon input to the measuring device 1200 is denoted by A, and the photon input to the measuring device 1202 is denoted by A'. The polarization state of a photon is indicated using a vertical bar; for example, A|H represents a horizontal polarization state for the photon A, and A'|V represents a vertical polarization state for the photon A'.

In addition the photon paths of the measuring devices in the pair are substantially the same length. That is, the distance from the source to the detectors in measuring device 1200 is substantially the same as the distance from the source to the detectors in measuring device 1202 and also for the other two measuring devices which are not shown in FIG. 12 for clarity.

Each measuring device comprises two polarizing beam splitters (PBS) 1228, 1224, 1230, 1226 as well as one or more mirrors 1236, 1238. When photon A, which is vertically polarized (photon A|V in FIG. 12), enters the measuring device 1200 it is transmitted to beam splitter (BS) 1220, passes through that beam splitter, reflects off a mirror and through the optical mode modifier 1232 which potentially changes the optical mode of the photon (depending on what the setting of the optical mode setter 1232 is), reflects off another mirror 1236 back into the beam splitter 1220 and reflects off a further mirror into polarization modifier 1244. As the photon is already vertically polarized, if polarization modifier 1244 does nothing, the vertically polarized photon passes into polarizing beam splitter 1224 before being detected by detector 1210 and not detected by detector 1208. If the polarization filter 1244 is configured to change polarization of photons which pass through it, then the photon becomes horizontally polarized and is detected by detector 1208. The input from the state expander 810 that gives a horizontally polarized photon (A|H) follows a path with configurable polarization modifier 1240 and through configurable optical mode setter 1232 to detectors 1204, 1206. The measuring device 1202 functions generally similarly as described for the device 1200 when acting on the photon A' in the polarization states A'|H or A'|V.

The measuring devices detect coincidences which are qubits detected at the detectors at the substantially the same time. The coincidences are assessed as described in more detail earlier in this document to see if a Bell inequality is violated. If a detector in a first one of a pair of the measuring devices detects a photon at a first time and a detector in the other one of the pair of the measuring devices detects a photon within a specified time of the first time (a coincidence), there is a likelihood that the detected photon is an entangled photon in superposition. For example, the specified time period can be in a range of 5 to 15 ns, e.g., about 10 ns.

However, if a detector in the single measuring device detects a photon at a first time and another detector in the single measuring device detects a photon within a specified time of the first time (a coincidence), there is a likelihood that the detected photon is a classical photon. Again, for example, the specified time period can be in a range of 5 to 15 ns, e.g., about 10 ns.

In each of the measuring devices 1200, 1202, there are four detectors comprising a first pair of detectors (1204, 1206 in measuring device 1200; 1212, 1214 in measuring device 1202) for each of two mutually orthogonal polarizations, and a second pair of detectors (1208, 1210 in measuring device 1200; 1216, 1218 in measuring device 1202) for each of two mutually orthogonal polarizations; where the first pair of detectors operates for a first optical mode and the second pair of detectors operates for a second optical mode. As described with reference to FIG. 12, the two mutually orthogonal polarizations can be horizontal (H) and vertical (V) polarizations.

The detector configuration apparatus comprises an apparatus to change a number of radians of a phase shift (also referred to as an optical mode) between two specified values (such as π radians and π/2 radians or another pair of phase shifts which are orthogonal), and to change a number of degrees of polarization between two specified values (such as horizontal and vertical, or zero degrees and 22.5 degrees, or another pair of polarization values), for use by individual ones of the detectors. The detector configuration apparatus receives the values of the control parameters from a first weak source of randomness 104 via a device driver 1250.

In an example the detector configuration apparatus receives the values of the control parameters as four bits since this is particularly efficient. However, other numbers of bits are used in other examples.

In an example an output of the measuring devices comprises, for each measurement device, two bits, each bit representing whether a photon was detected or not in a given measurement basis. In an example there are four measurement devices and the resulting 8 bit output of the measurement devices is converted into a 4 bit output using a look-up table.

In some embodiments there is a two-device photonics implementation of the examples of FIGS. 3A and 3C. In this case the source 300 of FIG. 3A can be a laser which emits photons, some of which are classical and some of which are entangled quantum photons. There are two quantum physical apparatuses 302, 304 as illustrated in FIG. 3A, and each quantum apparatus is able to store two qubits in contrast to the embodiment of FIG. 2A. Apparatus 302 comprises a state expander 310 comprising two waveguides so that it is able to store two qubits. Apparatus 304 also comprises a state expander 310 comprising two waveguides so that it is able to store two qubits. The waveguides can be implemented as described with reference to FIG. 8 to FIG. 11A and FIG. 11B. The quantum state of at least some of the photons stored in the state expanders 310 in the two-device photonics embodiment is different from that of the four-device photonics embodiment as described above in the examples which are not limited to any particular type of qubit implementation.

In the two-device photonics embodiment there are two measuring devices 312 as illustrated in FIG. 3A. The measuring devices are generally as illustrated in FIG. 12 although modified to enable nine different measurement bases for each detector. This can be done by using nine different polarization and/or optical mode settings.

Using the same principles as for the four-device photonics embodiment, patterns of detection events at the photon detectors of the measuring devices are recorded over many measurements at the photon detectors. The patterns of detection events are used as evidence for or against presence of qubits and violation of a Bell inequality. Optionally, a further check (security test B) is completed, as explained above.

Alternatively or in addition to the other examples described herein, examples include any combination of the following:

Clause 1. A method of generating a random bit string, the method comprising: providing a weak source of randomness;
providing a quantum device configured to entangle a plurality of quantum particles in a quantum state;
measuring each of the plurality of particles in two different bases;
determining a level of violation of a Bell inequality;
determining whether to accept or abort based at least partly on the determined level of violation;
extracting the random bit string via a two-source extractor. By determining the level of violation of a Bell inequality it is possible to determine whether the output of the quantum device, comprising the measured particles, is from classical effects or from quantum effects. The process may abort if the output is from classical effects. If the process accepts then the output of the quantum device is known to be from quantum effects without the need for a human to visually or manually inspect the quantum device itself. When the process accepts the output comprises measurements of quantum effects and this non-deterministic output is used by a two-source extractor to generate random bit strings on demand, as required by a downstream process such as an encryption or authentication process or other downstream process which uses random bit strings. Since the input to the two-source extractor is a random bit string known to be from a quantum source the output of the two-source extractor is random.

Clause 2. The method of clause 1, wherein the Bell inequality comprises the CHSH (Clauser Home Shimony Holt) inequality. Where the CHSH inequality is used there is an accurate and efficient way of determining that the output of the measuring is from quantum effects or from classical effects.

Clause 3. The method of clause 1 or clause 2, wherein the plurality of quantum particles is 2 or 4. By using pairs of quantum particles the Bell inequality may be assessed in a particularly effective manner.

Clause 4. The method of any one of clauses 1-3, wherein determining whether to accept or abort comprises determining whether quantum device satisfies a non-signaling criterion. By determining whether the quantum device satisfied a non-signaling criterion accuracy and quality are improved. This is because situations where quantum systems within the quantum device influence one another are detected and the process aborts in such situations.

Clause 5. The method of clause 4, wherein the non-signaling criterion comprises a criterion for approximate non-signaling. Using an approximate non-signaling criterion is found to give accurate working results in a practical efficient manner. Where quantum devices need only be approximately non-signaling, manufacturing a system that implements the method is more practical.

Clause 6. A system for generating a random bit string, the system comprising:
a weak source of randomness configured to repeatedly generate a first bit string and a second bit string;
a quantum device configured to receive the second bit strings and output associated third bit strings;
a security test device configured to compute a test statistic by comparing, for each second bit string and associated third bit string, the second bit string and the third bit string; the security test device configured to determine whether to accept or reject the output of the quantum device on the basis of the computed test statistic; and
a two-source extractor configured to receive, if the security test device accepts the output of the quantum device, the first bit string and the third bit string and to generate the random bit string. The system has the benefit of being able to generate truly random bit strings since only outputs of the quantum device which pass the security test and so are known to be from quantum effects are used.

Clause 7. The system of clause 6, wherein the quantum device comprises a photonics device, an ion trap, or a superconducting circuit. In this way various different types of technology are usable to implement the system.

Clause 8. The system of clause 6 or clause 7, wherein the quantum device comprises 2 or 4 quantum systems, each quantum system comprising a qubit. By using pairs of quantum systems it is possible to accurately assess the Bell inequality.

Clause 9. The system of clause 8, wherein the quantum system comprises a measurement apparatus configured to perform a measurement on the qubit and to output a bit that comprises a result of the measurement. The measurement apparatus outputs bits that form random bit strings.

Clause 10. The system of any one of clauses 6-9, wherein the security test comprises:
a first test in which a violation of a Bell inequality is measured; and
a second test to determine whether the quantum device satisfies a non-signaling criterion. By using two tests the quality of the output from the quantum device is determined to be from quantum effects and also from quantum systems which are not influencing one another within the quantum device. The Bell inequality can comprise a Clauser Home Shimony Holt (CHSH) inequality.

Clause 11. The system of clause 10, wherein the non-signaling criterion comprises a criterion for approximate non-signaling. Using an approximate non-signaling criterion is efficient and effective.

Clause 12. A system configured to output a random bit, the system comprising:
a quantum generator configured to generate an entangled pair of particles, a and a;
a first state expansion device configured to generate an entangled state comprising a and b;
a second state expansion device configured to generate an entangled state comprising a' and b';
a first measurement device configured to perform a coincidence measurement relating to a two-fold coincidence of ab or a'b or ab' or a'b';
a second measurement device configured to measure violation of a Bell inequality and to determine whether the entangled states are non-signaling; and
a two-source extractor configured to receive input from the second measurement device and to output a random bit. The system is a practical apparatus which outputs random bits which are known to be generated from a quantum system without the need to manually inspect the inner workings of the system itself.

Clause 13. A security test logic having:
a memory storing measurements from a measurement apparatus, the measurement outputs comprising indications of presence or absence of coincidences where particles are detected at more than one detector at substantially the same time, the detectors being at the end of different channels from a particle source and having substantially the same length;
a processor configured to compute a test statistic from the stored measurements the test statistic expressing a Bell inequality, and to compare the test statistic with a threshold; the processor configured to generate and output a certificate certifying that the measurements are from a quantum system if the value of the computed test statistic is below the threshold. The security test logic is a practical and efficient apparatus which automatically certifies measurements as being from a quantum system, without the need for manual inspection of the workings of the quantum system.

Clause 14. The security test logic of clause 13 wherein the processor is configured to compute the test statistic by computing the reciprocal of the number of measurements, times the sum over the number of measurements, of appropriate entries in an array holding binary values, the appropriate entries being looked up in the array according to values of measurement settings of detectors used in the quantum measurement apparatus when individual ones of the measurements were made. The security test logic is able to compute the test statistic in an efficient, accurate manner since the array is easy to operate.

Clause 15. The security test logic of clause 14 wherein the array acts to assess the coincidences as being evidence for or against quantum effects having generated individual ones of the measurements. The array is straightforward to use and store and enables the security test logic to be efficient.

Clause 16. The security test logic of any of clauses 13 to 15 wherein the channels carry qubits which are in either of the following quantum states: a quantum state equal to the reciprocal of the square root of two times the sum of the quantum states of two pairs of qubits, where the quantum states of the pairs of qubits are entangled and in superposition; or a quantum state equal to one half of the sum, over i from 0 to 3, of the tensor product of a qubit on channel i with the same qubit. By using these quantum states the Bell inequality may be assessed in an effective manner. The Bell inequality can comprise a Clauser Horne Shimony Holt (CHSH) inequality.

Clause 17. The security test logic of any of clauses 13 to 16 wherein the processor is further configured to test for interaction between the individual measurement devices within the measurement apparatus, by creating a baseline histogram from the measurements and comparing the baseline histogram with one or more test histograms of measurements obtained from the measurement apparatus. In this way, interaction between the measurement devices is detected in an efficient and effective manner.

Clause 18. The security test logic of any of clauses 13 to 17 wherein the processor is further configured to compute a second test statistic and take the second test statistic into account before deciding whether to generate the certificate. The second test statistic enables accurate and high quality results to be obtained.

Clause 19. An apparatus for creating a quantum superposition of a photon comprising:
at least one pair of waveguides, each waveguide comprising a plurality of blocks of light displacing material interspersed with a plurality of polarization modifiers;
an input to receive a pair of entangled photons each member of the pair having a polarization which is mutually orthogonal with respect to the other member of the pair, the input connected to the pair of waveguides such that each waveguide receives one of the pair of entangled photons and guides the entangled photon within the waveguide through the blocks of light displacing material and the polarization modifiers to create a quantum superposition of the photon whereby there are a plurality of possible paths the photon follows within the waveguide along which polarization is changed; and
wherein each waveguide is sized and shaped such that, for each entangled photon a length of a path travelled by the photon through the waveguide is substantially the same irrespective of the mutually orthogonal polarizations of the entangled photons. The apparatus is practical to deploy and enables quantum superposition of a photon to be created in a robust and accurate manner.

Clause 20. The apparatus of clause 19 comprising, for each waveguide, a pair of output optical fibres, each output optical fibre of a pair being configured to accept light which is polarized in one of the mutually orthogonal polarizations and to discard light which is polarized in the other mutually orthogonal polarization. In this way the output optical fibres provide an output suitable for input to a quantum measurement device for use in assessing a Bell inequality.

Clause 21. The apparatus of clause 19 or clause 20 wherein the plurality of blocks of light displacing material comprise at least one block formed of a material which displaces light in a first direction, and at least one block formed from material which displaces light in a second direction different from the first direction. In this way light is displaced in different directions in order to create quantum superposition of a photon.

Clause 22. The apparatus of clause 21 wherein the at least one block which displaces light in a first direction is made from an up-air crystal, and the at least one block which displaces light in the second direction is made from a down-air crystal. Using crystals in this manner facilitates creating quantum superposition of a photon.

Clause 23. The apparatus of any of clauses 19 to 22 wherein the plurality of blocks of light displacing material are made of the same material. Using the same material reduces manufacturing costs and facilitates ease of manufacture and/or repair of the apparatus.

Clause 24. The apparatus of any of clauses 19 to 22 wherein the blocks of light displacing material are made from one or more of: calcite, lithium niobate. Using these materials facilitates manufacture since these materials are suitable for cutting or forming to a specified size and shape within a specified tolerance.

Clause 25. The apparatus of any of clauses 19 to 24 comprising six blocks of light displacing material. Using six blocks of light displacing material is found to give particularly good results in terms of generating quantum superposition of photons.

Clause 26. The apparatus of clause 25 wherein the six blocks of light displacing material are made from up-air crystal and down-air crystal arranged in the following sequence from an output end of the waveguide to an input end of the waveguide: down-air crystal, up-air crystal, up-air crystal, down-air crystal, down-air crystal, up-air crystal. This arrangement is found to give particularly good results in terms of generating quantum superposition of photons.

Clause 27. The apparatus of clause 26 wherein the polarization modifiers are placed in the sequence of blocks of light displacing material in the following order from an output end of the waveguide to an input end of the waveguide and with or without the following air gaps: polarization modifier, air gap, down-air crystal, polarization modifier, up-air crystal, air gap, polarization modifier, air gap, up-air crystal, polarization modifier, down-air crystal, air gap, polarization modifier, air gap, down-air crystal, polarization modifier, up-air crystal. This arrangement is found to give particularly good results in terms of generating quantum superposition of photons.

Clause 28. The apparatus of any of clauses 19 to 27 wherein the polarization modifiers are half wave plates. Using half wave plates gives good results and at the same time simplifies manufacture of the apparatus.

Clause 29. The apparatus of any of clauses 19 to 28 wherein a plurality of the polarization modifiers are separated from adjacent ones of the blocks of light displacing material by air gaps. Using air gaps is a light weight, low cost solution.

Clause 30. The apparatus of any of clauses 19 to 29 wherein a second plurality of the polarization modifiers are in contact with adjacent ones of the blocks of light displacing material. Using an "in contact" arrangement is simple to manufacture and gives a compact arrangement.

Clause 31. The apparatus of any of clauses 19 to 30 wherein at least one of the polarization modifiers comprises a region through which light passes without modification of polarization. Using a region in this way is an efficient means of enabling the light to pass without modification.

Clause 32. The apparatus of any of clauses 19 to 31 further comprising a casing holding the apparatus, the casing being formed from material which reduces the influence of atmospheric pressure, vibration, humidity on the waveguides. Using a casing facilitates practical deployment of the apparatus.

Clause 33. The apparatus of any of clauses 19 to 32 further comprising a cooling chamber holding the waveguides and configured to reduce the temperature of the waveguides to around minus twenty degrees Celsius. Using a cooling chamber helps to reduce classical noise.

Clause 34. A method for creating superposition of states comprising:
receiving from a generator, a pair of entangled photons each member of the pair having a polarization which is mutually orthogonal with respect to the other member of the pair,
inputting the entangled photons to a pair of waveguides, such that each waveguide receives one of the pair of entangled photons and guides the entangled photon within the waveguide along its length to create a quantum superposition of the photon whereby there are a plurality of possible paths the photon follows within the waveguide along which polarization is changed; and
wherein each waveguide is sized and shaped such that, for each entangled photon a length of a path travelled by the photon through the waveguide is substantially the same irrespective of the mutually orthogonal polarizations of the entangled photons. The methods is a practical and effective way of creating superposition of states. The method is suitable for use with an apparatus for detecting entangled photon pairs in order to assess presence or absence of a Bell inequality.

Clause 35. An apparatus for detecting entangled photon pairs which are in superposition in a stream of photons comprising both entangled photon pairs and classical photons, the apparatus comprising:
at least one pair of measuring devices, each measuring device comprising:
a plurality of detectors, each detector arranged to detect single photons;
detector configuration apparatus, to automatically configure according to values of control parameters, for each detector, a measurement basis of the detector;
a photon input having two photon paths one for each of two possible mutually orthogonal photon polarizations, each photon path travelling to a different one of the detectors and wherein the photon paths within a single measuring device are substantially the same length;
and wherein the photon paths of the measuring devices in the pair are substantially the same length. The apparatus is a practical apparatus for detecting photon pairs which are entangled.

Clause 36. The apparatus of clause 35 comprising a security test logic for assessing coincidences detected at the detectors, coincidences being photons detected at more than one of the detectors within a specified time interval, and where the security test logic checks if a detector in a first one of a pair of the measuring devices detects a photon at a first time and a detector in the other one of the pair of the measuring devices detects a photon within a specified time of the first time, such that there is a likelihood that the detected photon is an entangled photon in superposition. In this way the apparatus is able to collect evidence as to whether particles detected at the measuring devices are from quantum effects or from classical effects.

Clause 37. The apparatus of clause 36 wherein the security test logic checks coincidences at which photons are detected at the detectors within a single measuring device, such that if a detector the single measuring device detects a photon at a first time and another detector in the single measuring device detects a photon within a specified time of the first time, there is a likelihood that the detected photon is a classical photon. In this way the apparatus is able to collect evidence as to whether particles detected at the measuring devices are from quantum effects or from classical effects.

Clause 38. The apparatus of any of clauses 35 to 37 wherein, in each of the measuring devices, there are four detectors comprising a first pair of detectors for each of two mutually orthogonal polarizations, and a second pair of detectors for each of two mutually orthogonal polarizations; where the first pair of detectors operates for a first optical mode and the second pair of detectors operates for a second optical mode. In this way the detectors are able to detect quantum particles which are in a superposition of states.

Clause 39. The apparatus of any of clauses 35 to 38 wherein the detector configuration apparatus comprises an apparatus to change a number of radians of a phase shift between two specified values, and to change a number of degrees of polarization between two specified values, for use by individual ones of the detectors. The configuration apparatus gives the benefit of being able to easily change what individual ones of the detectors detect.

Clause 40. The apparatus of any of clauses 35 to 39 wherein the detector configuration apparatus receives the values of the control parameters from a first weak source of randomness. This gives a simple and effective way of configuring the detectors.

Clause 41. The apparatus of any of clauses 35 to 39 wherein the detector configuration apparatus receives the values of the control parameters as four bits. This gives a compact signal for configuring the detectors.

Clause 42. The apparatus of any of clauses 35 to 39 wherein an output of the monitoring apparatus comprises, for each measurement device, two bits, each bit representing whether a photon was detected or not in a given measurement basis. This gives a digital measurement output, as opposed to an analog output. A digital output is convenient for use with downstream digital processes.

Clause 43. An apparatus for providing a random number, the apparatus comprising:
an energy source configured to output qubits;
a plurality of quantum systems in communication with the energy source, each of the plurality of quantum systems comprising:
  a state expander configured to produce a qubit in an entangled quantum state; and
  a measuring device configured to detect the qubit in at least one measurement basis;
a driver configured to accept a first input from a source of randomness and to adjust the at least one measurement basis of each of the measuring devices based at least partly on the first input;
a hardware processor configured to:
  analyze qubit detections by the measuring devices;
  determine that a violation of a Bell inequality occurs;
  determine that the plurality of quantum systems satisfy a no-signaling condition;
  output, based on the analyzed qubit detections, a quantum-certifiable string; and
  extract, based on the quantum-certifiable string and a second input from the source of randomness, a random number.

Clause 44. The apparatus of clause 43, wherein the energy source comprises a laser.

Clause 45. The apparatus of clause 43 or 44, wherein the state expander comprises a pair of waveguides.

Clause 46. The apparatus of any of clauses 43 to 45, wherein the plurality of quantum systems comprise two quantum systems.

Clause 47. The apparatus of clause 46, where the at least one measurement basis comprises two measurement bases.

Clause 48. The apparatus of any of clauses 43 to 45, wherein the plurality of quantum systems comprise four quantum systems.

Clause 49. The apparatus of clause 48, where the at least one measurement basis comprises nine measurement bases.

Clause 50. The apparatus of any of clauses 43 to 49, wherein the source of randomness comprises a weak source of randomness or a source of noncertifiable nondeterministic random numbers.

Clause 51. The apparatus of any of clauses 43 to 50, wherein to determine that a violation of a Bell inequality occurs, the hardware processor is configured to determine that a test statistic is below a threshold, wherein the test statistic comprises a Bell indicator vector applied to coincidences detected by the measuring devices.

Clause 52. The apparatus of any of clauses 43 to 51, wherein to determine that the plurality of quantum systems satisfy a no-signaling condition, the hardware processor is configured to compare a first probability distribution of outputs of the measuring devices conditioned on measurement settings of the measuring devices at a first time with a second probability distribution of outputs of the measuring devices conditioned on measurement settings of the measuring devices at a second time.

Clause 53. The apparatus of any of clauses 43 to 52, wherein to determine that a violation of a Bell inequality occurs, the hardware processor is configured to evaluate a value of a random variable corresponding to an observed measurement value of a measuring device and a corresponding value of a measurement setting for the measuring device.

Clause 54. The apparatus of any of clauses 43 to 53, wherein the hardware processor is configured to output a certificate that the random number is a product of quantum effects.

Clause 55. The apparatus of clauses 43 to 54, further comprising an application configured to receive the random number, the application comprising a computer security application, a meteorological forecasting application, a telecommunications application, or a manufacturing control application.

The term "computer" or "computing-based device" is used herein to refer to any device with processing capability such that it executes instructions. Those skilled in the art will realize that such processing capabilities are incorporated into many different devices and therefore the terms "computer" and "computing-based device" each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible, non-transitory storage medium, e.g., in the form of a computer program comprising computer program code adapted to perform the operations of one or more of the methods described herein when the program is run on a computer and where the computer program may be embodied on a non-transitory computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. No single feature or group of features is necessary or indispensable to every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, blocks, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A; B; C; A and B; A and C; B and C; and A, B, and C. Conjunctive language such as the phrase "at least one of X, Y, and Z," unless specifically stated otherwise, is otherwise understood with the context as used in general to convey that an item, term, etc. may be at least one of X, Y, or Z. Thus, such conjunctive language is not generally intended to imply that certain embodiments require at least one of X, at least one of Y, and at least one of Z to each be present.

The operations of the methods described herein may be carried out in any suitable order, or simultaneously where appropriate. Additionally, individual blocks may be deleted from, combined with other blocks, or rearranged in any of the methods without departing from the scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples, and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A random number generation system for generating a random bit string, the random number generation system comprising:
    a weak source of randomness configured to repeatedly generate a first bit string and a second bit string, the first bit string and the second bit string generated in one instance not necessarily having the same values as the first bit string and the second bit string generated in another instance;
    a quantum apparatus configured to receive one or more of the second bit strings and, for each of one or more of the second bit strings the quantum apparatus receives, to generate an associated third bit string, wherein the quantum apparatus comprises a plurality of quantum systems;
    a security test logic system comprising a processor configured to:
        determine whether the plurality of quantum systems are approximately non-signaling, and
        accept the associated third bit string based at least in part on determining that the plurality of quantum systems are approximately non-signaling; and
    a two-source extractor configured to receive, if the security test logic system accepts the associated third bit string, a bit string based on one or more of the first bit strings and a bit string based on one or more of the associated third bit strings and to generate the random bit string.

2. The system of claim 1, wherein the weak source of randomness comprises at least a first weak source of randomness to generate the first bit string and a second weak source of randomness to generate the second bit string.

3. The system of claim 1, wherein the processor is further configured to compute a test statistic and accept the associated third bit string based at least in part on the test statistic.

4. The system of claim 3, wherein the test statistic comprises determining that a Bell inequality is violated.

5. The system of claim 1, wherein the associated third bit string is generated based at least in part on a plurality of measurement settings selected using the one or more of the second bit strings.

6. The system of claim 1, wherein the plurality of quantum systems comprises 2 or 4 quantum systems, each quantum system configured to generate a qubit.

7. The system of claim 6, wherein each of the plurality of quantum systems comprises a measurement device configured to perform a measurement on the qubit and to output a bit that comprises a result of the measurement.

8. The system of claim 7, wherein the security test logic system further comprises a non-transitory memory and wherein the processor is configured to:
select a plurality of measurement settings wherein each measurement setting of the plurality of measurement settings is associated with a measurement device;
store a plurality of measurement results in the non-transitory memory wherein each measurement result is associated with a measurement setting of the plurality of measurement settings;
generate baseline histograms from the plurality of stored measurement results;
generate test histograms from the plurality of stored measurement results; and
determine whether the plurality of quantum systems are approximately non-signaling based at least in part on a comparison between the baseline histograms and the test histograms.

9. The system of claim 7, wherein the security test logic system further comprises a non-transitory memory and wherein the processor is configured to:
select a plurality of measurement settings based on the one or more of the second bit strings, wherein each measurement setting of the plurality of measurement settings is associated with a measurement device;
store a plurality of measurement results in the non-transitory memory wherein each measurement result is associated with a measurement setting of the plurality of measurement settings;
compute a test statistic using the plurality of stored measurement results; and
accept the associated third bit string based at least in part on the test statistic.

10. The system of claim 7, wherein the plurality of quantum systems comprises a detection system comprising the measurement device in each of the plurality of quantum systems, wherein the detection system comprises a plurality of detectors, wherein each measurement device comprises at least one of the plurality of detectors, and wherein the processor is further configured to computes a test statistic based at least in part on indications of presence or absence of coincidences associated with particles being detected by the plurality of detectors in the detection system at substantially the same time.

11. The system of claim 9, wherein the test statistic comprises determining a level of violation of a Bell inequality.

12. The system of claim 11, wherein the Bell inequality comprises a CHSH (Clauser Home Shimony Holt) inequality.

13. The system of claim 6, wherein the quantum apparatus comprises a quantum generator, wherein the plurality of quantum systems comprises a first and a second quantum system, and wherein:
the quantum generator is configured to generate an entangled pair of particles, a particle $\alpha$ and a particle b';
the first quantum system comprises a first measurement device and a first state expander, the first state expander configured to receive the particle $\alpha$ and generate an entangled state comprising $\alpha$ and b;
the second quantum system comprises a second measurement device and a second state expander, the second state expander configured to receive the particle $\alpha'$ and generate an entangled state comprising $\alpha'$ and b';
the first and the second measurement devices are configured to perform a coincidence measurement relating to a two-fold coincidence of $\alpha b$ or $\alpha' b$ or $\alpha b$ ' or $\alpha' b'$; and
the processor is further configured to measure violation of a Bell inequality.

14. The system of claim 13, the first and the second measurement devices are configured to perform the coincidence measurement based on a first measurement base associated with the first measurement device and a second measurement base associated with the second measurement device, wherein the processor selects the first and the second measurement bases using the one or more of the second bit strings.

15. The system of claim 1, wherein the quantum apparatus comprises a photonic device.

16. The system of claim 15, wherein each of the plurality of quantum systems comprises a state expander comprising at least a pair of waveguides.

17. The system of claim 16, further comprising a quantum generator configured to generate a pair of entangled photons, wherein the quantum apparatus is further configured to receive the pair of entangled photons, wherein each waveguide of the pair of waveguides receives one of the pair of entangled photons and guides the one of the pair of entangled photon within the waveguide to create a quantum superposition of the entangled photon whereby there are a plurality of possible paths the entangled photon follows within the waveguide.

18. The system of claim 17 wherein the quantum apparatus comprises at least one pair of measuring devices, each measuring device comprising:
a plurality of detectors, each detector arranged to detect single photons;
a detector configuration apparatus, to configure a measurement basis of each detector according to values of control parameters;
a photon input having two photon paths, each photon path travelling to a different one of the detectors and wherein the photon paths within a single measuring device are substantially the same length;
wherein the photon paths of the measuring devices in the pair are substantially the same length.

19. The system of claim 18, the processor is further configured to assess the occurrence of coincidences, wherein a coincidence comprises photons detected at more than one of the detectors within a set time interval, and wherein the processor checks whether a detector in a first one of the at least one pair of the measuring devices detects a photon at a first time and a detector in the other one of the a fiat least one pair of the measuring devices detects a photon within the set time interval relative to the first time, wherein occurrence of a coincidence indicates a likelihood that the detectors detected an entangled photon in superposition.

20. The system of claim 19, wherein the set time interval is 15 nanoseconds or shorter.

21. The system of claim 18 wherein the processor is further configured to check coincidences at which photons are detected at the detectors within a single measuring device, such that if a detector in the single measuring device detects a photon at a first time and another detector in the single measuring device detects a photon within a specified time of the first time, there is a likelihood that the detected photon is a classical photon.

22. The system of claim 18 wherein the detector configuration apparatus is configured to determine the values of the control parameters based at least on part on the second bit string.

23. The system of claim 22 wherein the detector configuration apparatus is configured to receive the values of the control parameters as four bits.

24. The system of claim 18 wherein an output of the quantum apparatus comprises, for each measurement device, two bits, each bit representing whether a photon was detected or not in a given measurement basis.

25. An encryption system for computer security, the encryption system comprising:
- the random number generation system of claim 1, and
- an output signal connection configured to connect to a computer security system, wherein the encryption system is configured to send the random bit string to the computer security system via the output signal connection.

* * * * *